United States Patent
Miller et al.

(10) Patent No.: US 11,942,689 B2
(45) Date of Patent: Mar. 26, 2024

(54) RADAR ANTENNA SYSTEM AND METHOD

(71) Applicant: Nanowave Technologies Inc., Etobicoke (CA)

(72) Inventors: Justin Miller, Etobicoke (CA); Charles William Tremlett Nicholls, Nepean (CA); Keegan Pitre, Ottawa (CA)

(73) Assignee: Nanowave Technologies Inc., Etobicoke (CA)

( * ) Notice: Subject to any disclaimer, the term of this patent is extended or adjusted under 35 U.S.C. 154(b) by 542 days.

(21) Appl. No.: 17/058,382

(22) PCT Filed: May 24, 2019

(86) PCT No.: PCT/CA2019/050711
§ 371 (c)(1),
(2) Date: Nov. 24, 2020

(87) PCT Pub. No.: WO2019/222859
PCT Pub. Date: Nov. 28, 2019

(65) Prior Publication Data
US 2021/0203081 A1    Jul. 1, 2021

Related U.S. Application Data

(60) Provisional application No. 62/676,198, filed on May 24, 2018.

(51) Int. Cl.
*H01Q 21/28* (2006.01)
*G01S 7/00* (2006.01)
(Continued)

(52) U.S. Cl.
CPC .......... *H01Q 21/064* (2013.01); *G01S 7/006* (2013.01); *G01S 7/032* (2013.01); *G01S 13/10* (2013.01);
(Continued)

(58) Field of Classification Search
CPC ........ H01Q 21/064; H01Q 3/08; H01Q 21/28; G01S 7/006; G01S 7/032; G01S 13/10; G01S 13/726; G01S 7/28
See application file for complete search history.

(56) References Cited

U.S. PATENT DOCUMENTS

| 4,328,495 A | 5/1982 | Thue |
| 5,036,324 A | 7/1991 | Lamper et al. |

(Continued)

FOREIGN PATENT DOCUMENTS

| EP | 1365472 B1 | 12/2007 |
| EP | 1604427 B1 | 2/2010 |
| WO | 2016204665 A1 | 12/2016 |

OTHER PUBLICATIONS

International Patent Application No. PCT/CA2019/050710, International Preliminary Report on Patentability dated Nov. 24, 2020.
(Continued)

*Primary Examiner* — Graham P Smith
(74) *Attorney, Agent, or Firm* — BORDEN LADNER GERVAIS LLP; Curtis Behmann

(57) ABSTRACT

A RADAR antenna system and method are provided. In an implementation, the system includes a base and first and second antennas configured to transmit independent first and second antenna beams, respectively. The first and second antennas are each coupled to the base so as to provide a common rotational axis for the first and second antennas. An antenna position controller is configured to independently control first and second transmission positions associated with the first and second antennas, respectively. Two different antenna technologies can be used, for example one for providing communications capability and the other for providing tracking capability. Other implementations include four or more antennas configured to transmit beams at similar or different frequencies. Improvements in scan rate (Continued)

proportional to the number of antennas are achieved compared to that achievable with a single beam, without an increase in the rotation rate of the antenna system.

22 Claims, 22 Drawing Sheets

(51) Int. Cl.
*G01S 7/03* (2006.01)
*G01S 13/10* (2006.01)
*G01S 13/72* (2006.01)
*H01Q 3/08* (2006.01)
*H01Q 21/06* (2006.01)
*G01S 7/28* (2006.01)

(52) U.S. Cl.
CPC ............ *G01S 13/726* (2013.01); *H01Q 3/08* (2013.01); *H01Q 21/28* (2013.01); *G01S 7/28* (2013.01)

(56) References Cited

U.S. PATENT DOCUMENTS

| | | | |
|---|---|---|---|
| 5,420,598 A | 5/1995 | Uematsu et al. | |
| 6,104,343 A | 8/2000 | Brookner et al. | |
| 6,232,920 B1 | 5/2001 | Brookner et al. | |
| 6,600,457 B2 | 7/2003 | Heinz et al. | |
| 6,639,546 B1 | 10/2003 | Ott et al. | |
| 7,081,848 B1 | 7/2006 | Adams | |
| 7,724,176 B1* | 5/2010 | Pruett | H01Q 3/08 |
| | | | 342/25 R |
| 8,446,326 B2 | 5/2013 | Tietjen | |
| 11,073,607 B2 | 7/2021 | Koubiadis et al. | |
| 2013/0278455 A1 | 10/2013 | Song | |
| 2014/0292563 A1 | 10/2014 | Palmer et al. | |
| 2015/0301158 A1 | 10/2015 | Foreman | |
| 2016/0195607 A1 | 7/2016 | Roulston et al. | |
| 2018/0156908 A1 | 6/2018 | Silander | |

OTHER PUBLICATIONS

International Patent Application No. PCT/CA2019/050711, International Preliminary Report on Patentability dated Nov. 24, 2020.
International Patent Application No. PCT/CA2019/050710, International Search Report and Written Opinion dated Jul. 31, 2019.
International Patent Application No. PCT/CA2019/050711, International Search Report and Written Opinion dated Jul. 31, 2019.
U.S. Appl. No. 17/058,421, Non-Final office Action dated Aug. 30, 2023.

* cited by examiner

RADAR ANTENNA SYSTEM AND METHOD

CROSS-REFERENCE TO RELATED APPLICATION

The present disclosure is related to co-pending patent application having the same inventors as the present application and entitled "SYSTEM AND METHOD FOR IMPROVED RADAR SENSITIVITY" filed of even date herewith, which is incorporated herein by reference.

FIELD

The present disclosure relates to RADAR (Radio Detection And Ranging) systems, including but not limited to RADAR antenna systems.

BACKGROUND

RADAR systems use radio waves to detect objects and determine object parameters such as range, angle or velocity. RADAR systems have broad ranges of use, from surveillance and navigation, to weather and meteorological monitoring, and a variety of military applications.

A RADAR system can have requirements with respect to beam formation and direction, as well as scan rate. Solid state RADAR antenna systems are increasingly used, though have some limitations compared to vacuum tube based RADAR systems. Active antenna arrays are known to achieve faster scan rates, but are extremely complex and high cost, which limits their applicability to high performance RADAR systems.

Improvements in RADAR architecture and antenna systems are desirable.

BRIEF DESCRIPTION OF THE DRAWINGS

Embodiments of the present disclosure will now be described, by way of example only, with reference to the attached Figures.

BRIEF SUMMARY

Figure 1:
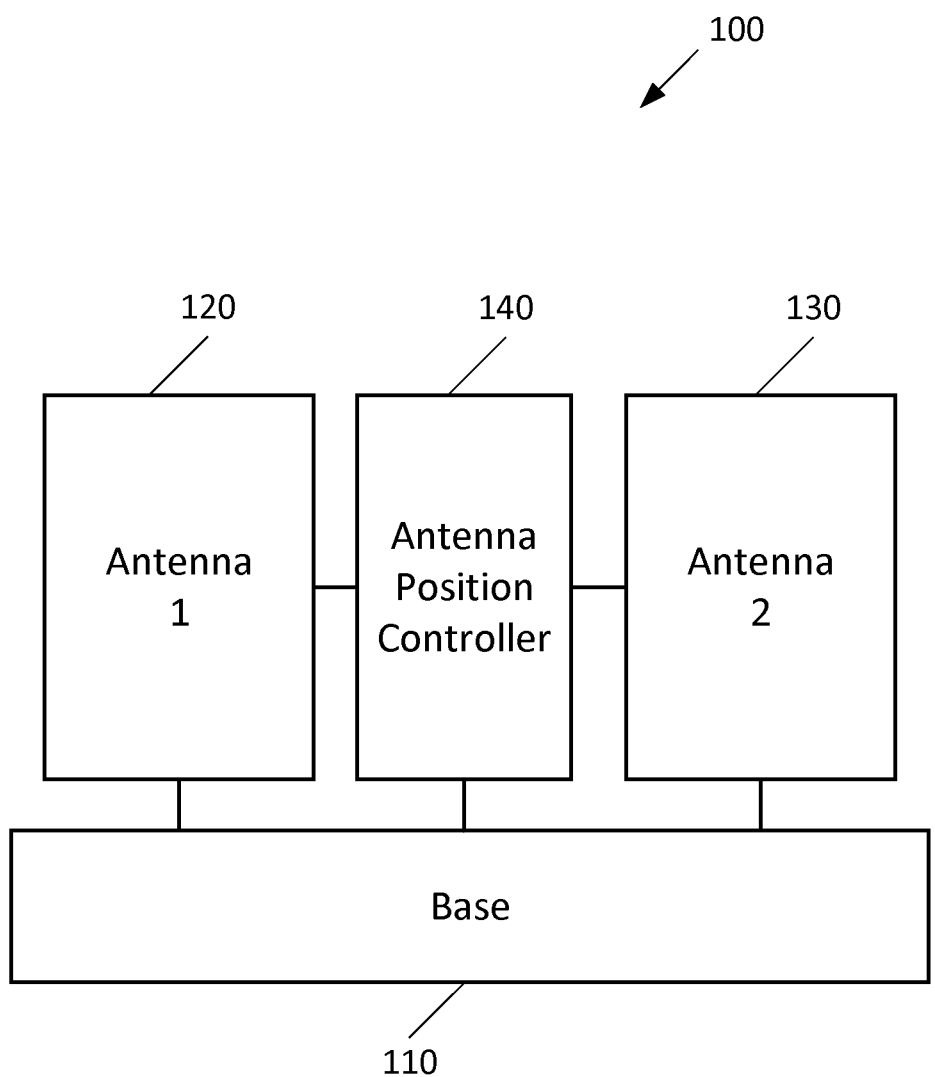
FIG. 1 is a block diagram illustrating a RADAR antenna system according to an embodiment of the present disclosure.

The following presents a simplified summary of the disclosure in order to provide a basic understanding of some aspects of the disclosure. It is not intended to identify key or critical elements of the embodiments or to delineate the scope of the embodiments. The following summary merely presents some concepts of the disclosure in a simplified form as a prelude to the more detailed description provided below.

In an embodiment, the present disclosure provides a RADAR antenna system comprising a base, and first and second antennas configured to transmit independent first and second antenna beams, respectively. The first and second antennas are each coupled to the base so as to provide a common rotational axis for the first and second antennas. The system further comprises an antenna position controller configured to independently control first and second transmission positions associated with the first and second antennas, respectively.

In an example embodiment, the antenna position controller and the first and second antennas cooperate to transmit the first and second antenna beams in opposite directions such that the first antenna beam is decoupled from the second antenna beam. In an example embodiment, the antenna position controller and the first and second antennas cooperate to transmit the first and second antenna beams in different directions. In an example embodiment, the antenna position controller and the first and second antennas cooperate to transmit the first and second antenna beams in opposite directions.

In an example embodiment, the antenna position controller is configured to independently control first and second elevations associated with the first and second antennas, respectively, to transmit the first and second antenna beams at different heights.

In an example embodiment, the antenna position controller and the first and second antennas cooperate to transmit the first and second antenna beams in opposite directions such that the first antenna beam is decoupled from the second antenna beam.

In an example embodiment, the antenna position controller comprises: a first actuator configured to move the first antenna in elevation; and a second actuator configured to move the second antenna in elevation. In an example embodiment, the first and second actuators each comprise a linear actuator. In an example embodiment, the first and second actuators each comprise a hydraulic actuator.

In an example embodiment, the system further comprises: a first actuator antenna connector configured to couple the first actuator to the first antenna; a first actuator base connector configured to couple the first actuator to the base; a second actuator antenna connector configured to couple the second actuator to the second antenna; and a second actuator base connector configured to couple the second actuator to the base.

In an example embodiment, the first antenna defines a plurality of actuator engagement points for coupling with at which the first plate connector is couplable to the first antenna. In an example embodiment, the plurality of actuator engagement points are provided at different heights along a vertical axis of the first antenna when the first antenna is in an upright position.

In an example embodiment, the system further comprises: a first antenna base connector configured to couple the first antenna to the base; and a second antenna base connector configured to couple the second antenna to the base. In an example embodiment, the first and second antenna base connectors comprise first and second fixed hinges configured to hingeably couple the first and second antennas to the base.

In an example embodiment, the system further comprises at least one base engagement member configured to facilitate engagement of the first and second antenna base connectors to the base. In an example embodiment, the first and second antenna base connectors comprise first and second pairs of ball bearing carriages configured to slidably couple the first and second antennas to the base, and the at least one base engagement member system further comprises: first and second linear slide rails provided on the base, the first and second slide rails configured to receive the first and second ball bearing carriages and to enable the slideable coupling of the first and second antennas to the base.

In an example embodiment, the system further comprises telescoping slide rails configured to enable slideable movement in elevation of the first and second antennas. In an example embodiment, the telescoping slide rails comprise first and second telescoping slide rails coupled to the first and second actuators, respectively, to receive the first and second actuator antenna connectors.

In an example embodiment, the first and second antennas operate at different first and second antenna beam frequencies to provide a dual band RADAR. In an example embodiment, the first and second antennas operate at different first and second antenna beam frequencies to provide the dual band RADAR operating at C-band and at X-band.

In an example embodiment, the system further comprises an enclosure coupled to the base, the first and second antennas being coupled to the enclosure so as to provide indirect coupling of the first and second antennas to the base.

In an example embodiment, the enclosure is shaped and profiled substantially similar to the first and second antennas, the enclosure being configured to reduce radiative coupling between the first antenna and the second antenna. In an example embodiment, the enclosure is coupled to the base via an enclosure base connector.

In an example embodiment, the system further comprises a first antenna mounting connector configured to couple the first antenna to the enclosure, and a second antenna mounting connector configured to couple the second antenna to the enclosure.

In an example embodiment, the position controller further comprises a first actuator configured to move the first antenna in at least one of position or elevation, and a second actuator configured to move the second antenna in at least one of position or elevation. In an example embodiment the first and second actuators each comprise a linear actuator. In an example embodiment the first and second actuators each comprise a hydraulic actuator.

In an example embodiment the system further comprises a first actuator antenna connector configured to couple the first actuator to the first antenna; a first actuator enclosure connector configured to couple the first actuator to the enclosure; a second actuator antenna connector configured to couple the second actuator to the second antenna, and a second actuator enclosure connector configured to couple the second actuator to the enclosure.

In an example embodiment, each of the first and second antennas are moveable anywhere between: a vertical operating position in which the first and second antennas are substantially orthogonal to the base, and a tilted operational position in which inner surfaces of the first and second antennas are at an acute angle relative to the base. In an example embodiment, the first antenna is provided at the tilted operational position and the acute angle relative to the base is 70 degrees, and the second antenna is provided at the vertical operating position substantially orthogonal to the base.

In an example embodiment, each of the first and second antennas are moveable anywhere between a vertical operating position in which the first and second antennas are substantially orthogonal to the base, and a horizontal operating position in which the first and second antennas are substantially parallel to the base.

In an example embodiment, the first and second antenna mounting connectors comprise first and second hinges configured to maintain a top of the first and second antennas at substantially the same height when moved from a first operating position to a second operating position.

In an example embodiment the enclosure houses an azimuth rotator operating at a rotation rate, and wherein the system operates at a scan rate SR2 that is higher than the rotation rate RR.

In an example embodiment the enclosure houses at least one transceiver communicatively coupled to the first and second antennas.

In an example embodiment, each of the first and second antennas is moveable between a plurality of operational positions. In an example embodiment, each of the first and second antennas is moveable between: a vertical operational position in which the first and second antennas are substantially orthogonal to the base, and a tilted operational position in which inner surfaces of the first and second antennas are at an acute angle with reference to a center of the base.

In an example embodiment, each of the first and second antennas is moveable between: a vertical operational position in which the first and second antennas are substantially orthogonal to the base, and a horizontal operational position in which the first and second antennas are substantially parallel to the base.

In an example embodiment, each of the first and second antennas is moveable between: a vertical outward facing operating position defined by +90 degrees tilt with respect to the base; a horizontal operating position parallel with the base; and a vertical inward facing operating position defined by −90 degrees tilt with respect to the base.

In an example embodiment, each of the first and second antennas is moveable between: a horizontal upward facing operating position defined by +90 degrees tilt with respect to a vertical axis; a vertical operating position parallel with the vertical axis; and a horizontal downward facing operating position defined by −90 degrees tilt with respect to the vertical axis.

In an example embodiment, each of the first and second antennas comprises a slotted array antenna. In an example embodiment, the slotted array antenna has a generally circular shape. In an example embodiment, the slotted array antenna has a generally annular shape with two opposing flat edges.

In an example embodiment, the first antenna has a first antenna type different from a second antenna type of the second antenna. In an example embodiment, the first antenna is configured to provide a communications function and the second antenna is configured to provide a tracking function.

In an example embodiment, the base comprises an azimuth rotator operating at a rotation rate, and wherein the system operates at a scan rate SR2 that is higher than the rotation rate RR. In an example embodiment, the scan rate SR2 at which the system providing the first and second antenna beams operates is higher than an original scan rate SR1 for a similar system that produces only one antenna beam.

In an example embodiment, the RADAR antenna system comprises a solid state RADAR antenna system, and the first antenna is configured to produce long pulses and the second antenna is configured to produce short pulses. In an example embodiment, the first and second antennas are configured to substantially simultaneously propagate the long pulses and the short pulses, respectively.

In an example embodiment, the system further comprises a processor configured to perform post-processing for the first and second antennas to align the post-processing results from the first and second antennas.

In another embodiment, the present disclosure provides a RADAR antenna system comprising a base and a plurality of antennas configured to transmit at least two independent antenna beams. The plurality of antennas are each coupled to the base so as to provide a common rotational axis. The system further comprises an antenna position controller configured to independently control a transmission position associated with each of the plurality of antennas.

In an example embodiment, the plurality of antennas are configured to produce an independent antenna beam for each of the plurality of antennas.

In an example embodiment, the antenna position controller is configured to independently control an elevation associated with each of the plurality of antennas, to transmit the independent antenna beams of each of the plurality of antennas at different heights.

In an example embodiment, the antenna position controller and the plurality of antennas cooperate to transmit the plurality of independent antenna beams such that each antenna beam is decoupled from each of the other antenna beams in the plurality of antenna beams.

In an example embodiment, the antenna position controller and the plurality of antennas cooperate to transmit the plurality of independent antenna beams in different directions. In an example embodiment, the antenna position controller and the plurality of antennas cooperate to transmit the plurality of independent antenna beams in opposite directions.

In an example embodiment, the plurality of antennas comprises four slotted array antennas having a pyramidal hexagon shape. In an example embodiment, the plurality of antennas comprises four slotted array antennas having an isosceles trapezoid shape. In an example embodiment, the plurality of antennas comprises four slotted array antennas having a substantially square or diamond shape.

In an example embodiment, the plurality of antennas comprises four antennas, and wherein the independent antenna beams for each of the four antennas each have a different beam frequency. In an example embodiment, wherein the four different beam frequencies are operated concurrently.

In an example embodiment, the plurality of antennas comprises four antennas, and wherein the independent antenna beams for each of the four antennas each have the same beam frequency.

In an example embodiment, the system further comprises: a plurality of RADAR transceivers equal in number to the plurality of antennas, each of the plurality of RADAR transceivers being uniquely associated with one of the plurality of transceivers; and a RADAR signal processor configured to perform post-processing for the plurality of antennas to align the post-processing results from the associated RADAR transceivers.

In an example embodiment, each of the plurality of RADAR transceivers comprises: a transmitter; a receiver; a circulator in communication with the associated antenna and with the transmitter and the receiver; an analog/digital converter (ADC) in communication with the transmitter; and a digital/analog converter (DAC) in communication with the receiver. The RADAR signal processor is in communication with each of the ADCs and with each of the DACs.

In an example embodiment, the RADAR antenna system comprises a solid state RADAR antenna system, and first and second RADAR transceivers of the plurality of RADAR transceivers are configured to produce long pulses at a first antenna and to produce short pulses at a second antenna, respectively. In an example embodiment, the first and second antennas are configured to substantially simultaneously transmit the long pulses and the short pulses, respectively.

In further example embodiments, the RADAR antenna system comprises combinations of features and sub-features recited herein. Such additional example embodiments include all reasonable combinations of features or sub-features that are described or illustrated herein, whether or not explicitly provided in such combinations of features or sub-features, and include all operable combinations as understood by one of ordinary skill in the art.

DETAILED DESCRIPTION

A RADAR antenna system and method are provided. In an implementation, the system includes a base and first and second antennas configured to transmit independent first and second antenna beams, respectively. The first and second antennas are each coupled to the base so as to provide a common rotational axis for the first and second antennas. An antenna position controller is configured to independently control first and second transmission positions associated with the first and second antennas, respectively. Two different antenna technologies can be used, for example one for providing communications capability and the other for providing tracking capability. Other implementations include four or more antennas configured to transmit beams at similar or different frequencies. Improvements in scan rate proportional to the number of antennas are achieved compared to that achievable with a single beam, without an increase in the rotation rate of the antenna system.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 is a block diagram illustrating a RADAR antenna system 100 according to an embodiment of the present disclosure. The RADAR antenna system 100 comprises a base 110, a first antenna 120 and a second antenna 130. The first and second antennas 120 and 130 are configured to transmit independent first and second antenna beams, respectively. The first and second antennas 120 and 130 are each coupled to the base 110 so as to provide a common rotational axis for the first and second antennas.

The system 100 also comprises an antenna position controller 140 configured to independently control first and second transmission positions associated with the first and second antennas 120 and 130, respectively. The different transmission positions advantageously enable transmission of the first and second antenna beams, for example in different directions, so that the first antenna beam is decoupled from the second antenna beam. For example, positioning the first and second antenna beams at different elevation angles enables the RADAR to scan the surrounding environment at twice the speed of a conventional antenna system. In another embodiment that will be described later, a fourfold increase in the scan rate can be achieved through the use of four antennas. Use of two antennas in the RADAR enables different environments to be scanned with potentially two different operating frequencies.

In an example embodiment, the antenna position controller 140 is configured to independently control first and second elevations associated with the first and second antennas 120 and 130, respectively, to enable transmission of the first and second antenna beams at different heights. In an embodiment, the antenna position controller 140 and the first and second antennas 120 and 130 cooperate to transmit the first and second antenna beams in opposite directions such that the first antenna beam is decoupled from the second antenna beam.

In an implementation, the first and second antennas 120 and 130 operate at different first and second antenna beam frequencies to provide a dual band RADAR, for example a dual band RADAR operating at C-band and at X-band. Such a system can enable improved long range weather sensitivity at C-band, while achieving high resolution short range sensitivity at X-band. In another implementation, the first and second antennas 120 and 130 operate at substantially similar first and second antenna beam frequencies.

In an example implementation, the base 110 comprises an azimuth rotator (not shown) operating at a rotation rate, and the system 100 according to an embodiment of the present disclosure operates at a scan rate that is higher than the rotation rate. In an example implementation, the scan rate SR2 at which the system 100 providing the first and second antenna beams operates is higher than a conventional scan rate SR1 for a known similar system that produces only one antenna beam.

Figure 2:
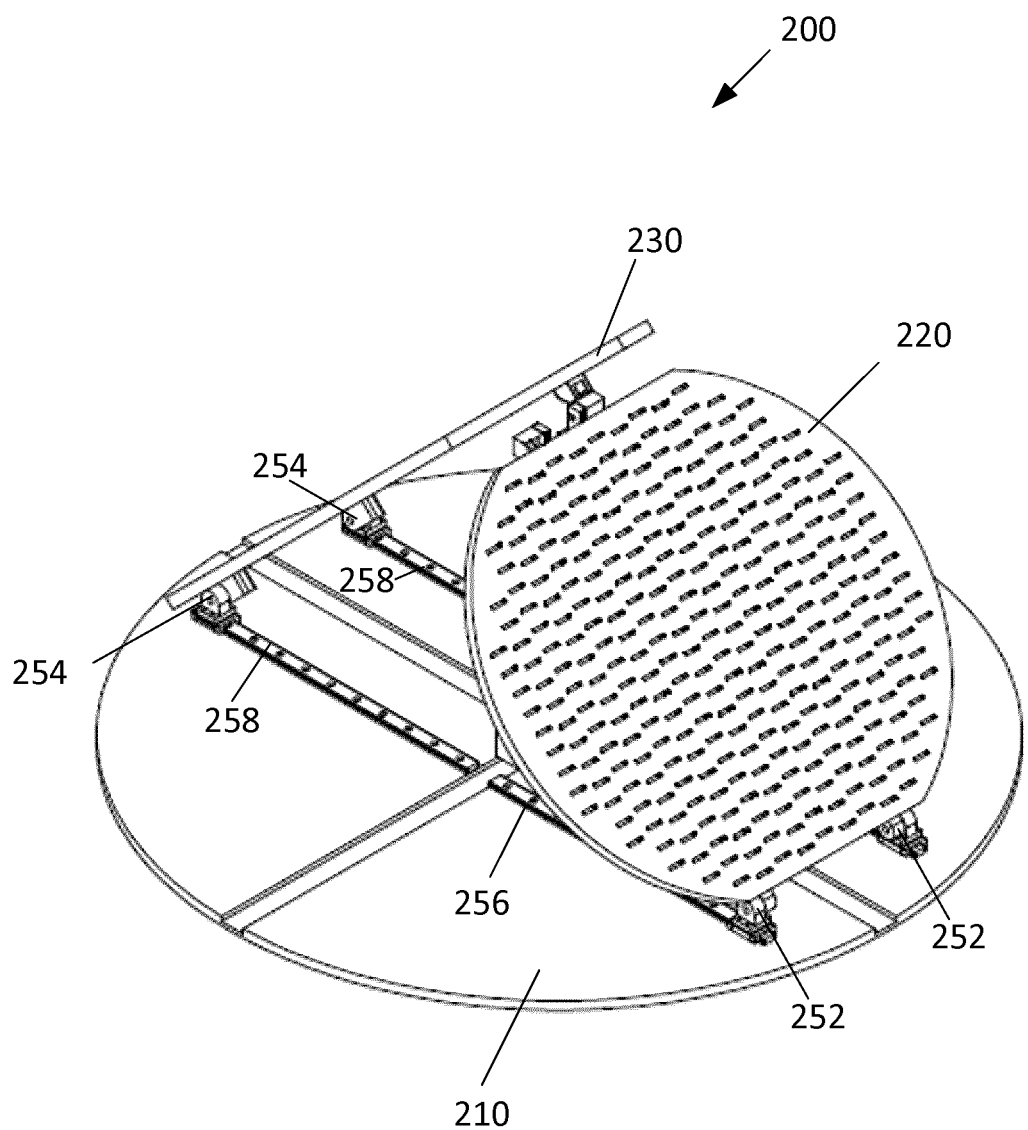
FIG. 2 illustrates a top perspective view of a RADAR antenna system according to an embodiment of the present disclosure having two antennas shown in a tilted position.

FIG. 2 illustrates a top perspective view of a RADAR antenna system 200 according to an embodiment of the present disclosure having two antennas shown in a tilted position. The RADAR antenna system 200 comprises a base 210, a first antenna 220 and a second antenna 230. In the example embodiment shown in FIG. 2, each of the first and second antennas 220 and 230 comprises a slotted array antenna, for example a slotted flat plate antenna having a generally circular shape, and in an embodiment having two opposing flat edges.

The system 200 can be implemented or used as a monopulse RADAR. In an implementation, three feeds are used to generate two beams, and the system can track a target and mechanically servo the antenna, following a target. In an embodiment according to monopulse operation, the first antenna 220 is used to track an incoming target while the second antenna 230 is tilted to the horizontal plane to enable a communication channel to be established to convey target information to a remote site. In an embodiment having a weather RADAR application, monopulse RADAR enables the RADAR to track severe weather such as a tornado and also monitor the atmospheric conditions vertically above the RADAR.

In another embodiment, the first and second antennas 220 and 230 comprise dual polar antennas. In a dual polar implementation, one polarization is vertical, and one is horizontal. An implementation running dual polar antennas on both antennas provides an advantage, such as reducing cross-polarization. In another dual polar implementation, one pole is run from the first antenna and the other pole is run from the second antenna.

The first and second antennas 220 and 230 are configured to transmit independent first and second antenna beams, respectively. The first and second antennas 220 and 230 are each coupled to the base 210 so as to provide a common rotational axis for the first and second antennas.

In an embodiment, the system 200 comprises a first base antenna connector configured to couple the first antenna to the base, and a second base antenna connector configured to couple the second antenna to the base. In an example embodiment, the first and second base antenna connectors and comprise first and second pairs of ball bearing carriages 252 and 254, respectively, configured to couple the first and second antennas 220 and 230 to the base 210. In an example embodiment, the system 200 comprises at least one base engagement member, for example a horizontal track, configured to facilitate engagement of the antenna base connectors to the base. In an example embodiment, the at least one base engagement member comprises first and second pairs of linear slide rails 256 and 258 provided on the base 210. Both of the linear slide rails 258 are visible in FIG. 2, and both of the linear slide rails 256 are visible in FIG. 3. The first and second pairs of slide rails, or horizontal tracks, 256 and 258 are configured to receive the first and second pairs of ball bearing carriages 252 and 254 and to enable the adjustable coupling of the first and second antennas 220 and 230 to the base 210.

Figure 3:
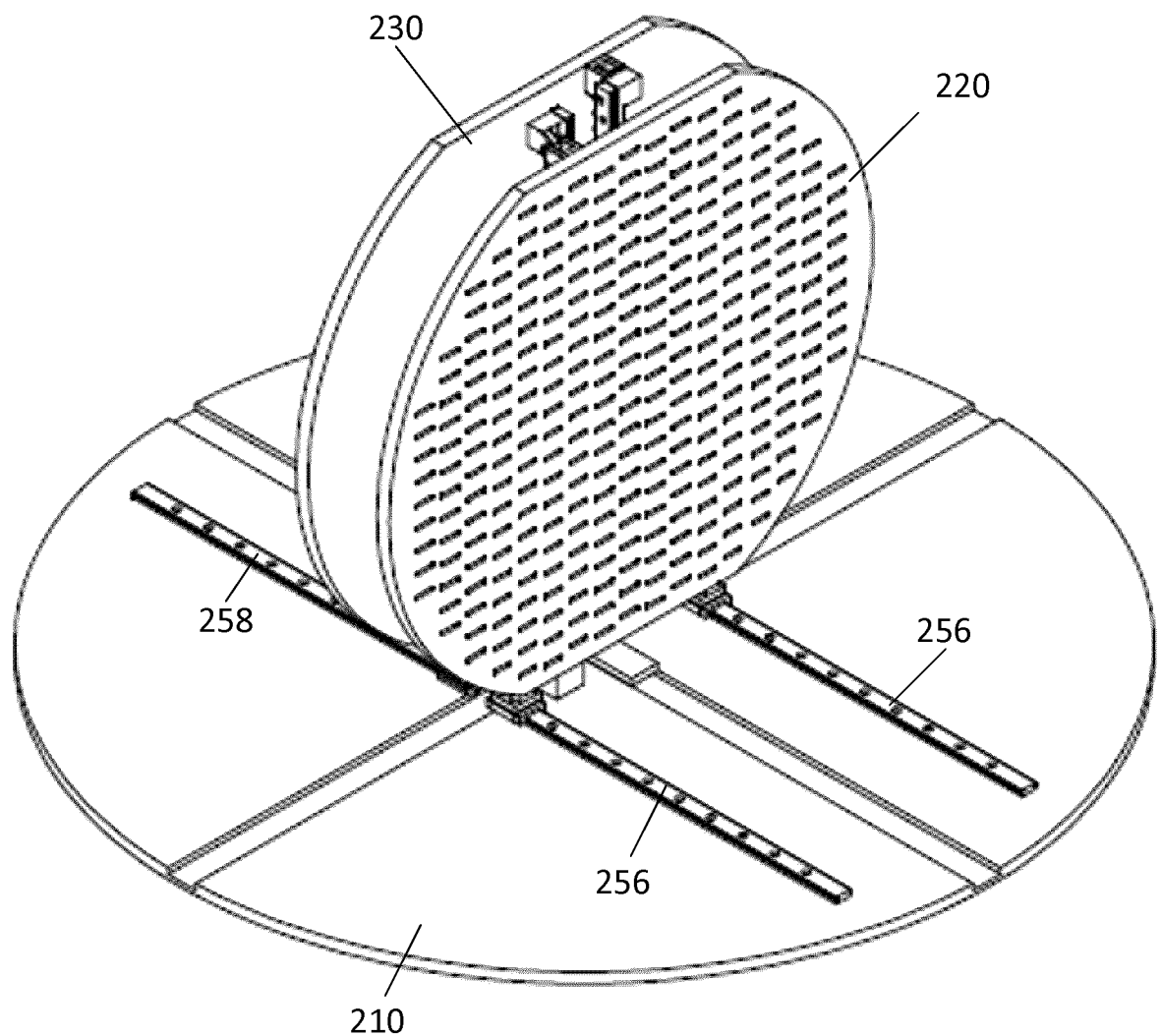
FIG. 3 illustrates the system of FIG. 2 with the two antennas in an upright position.
Figure 4:
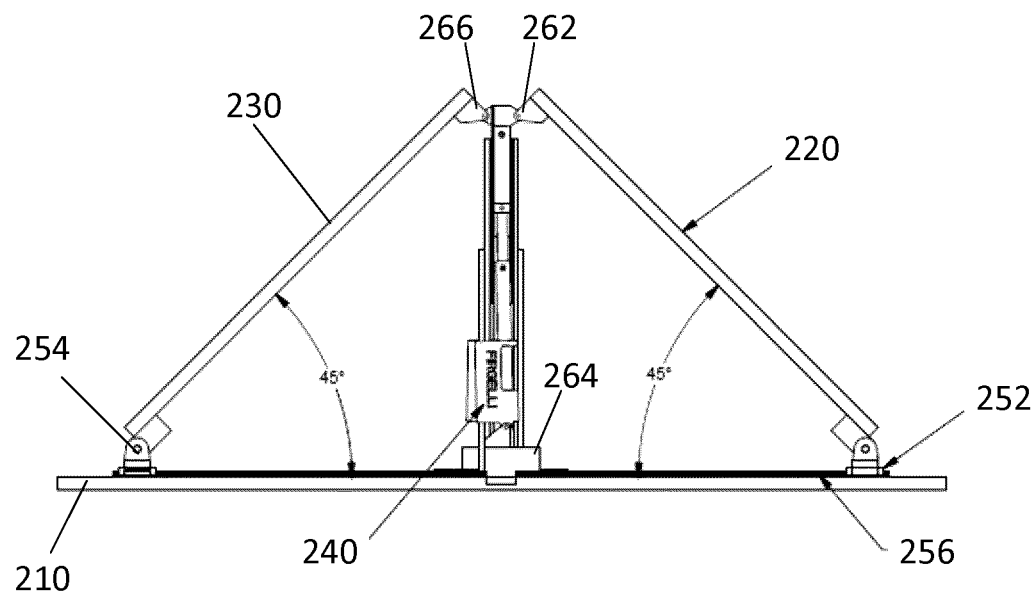
FIG. 4 illustrates a side view of the system of FIG. 2.
Figure 5:
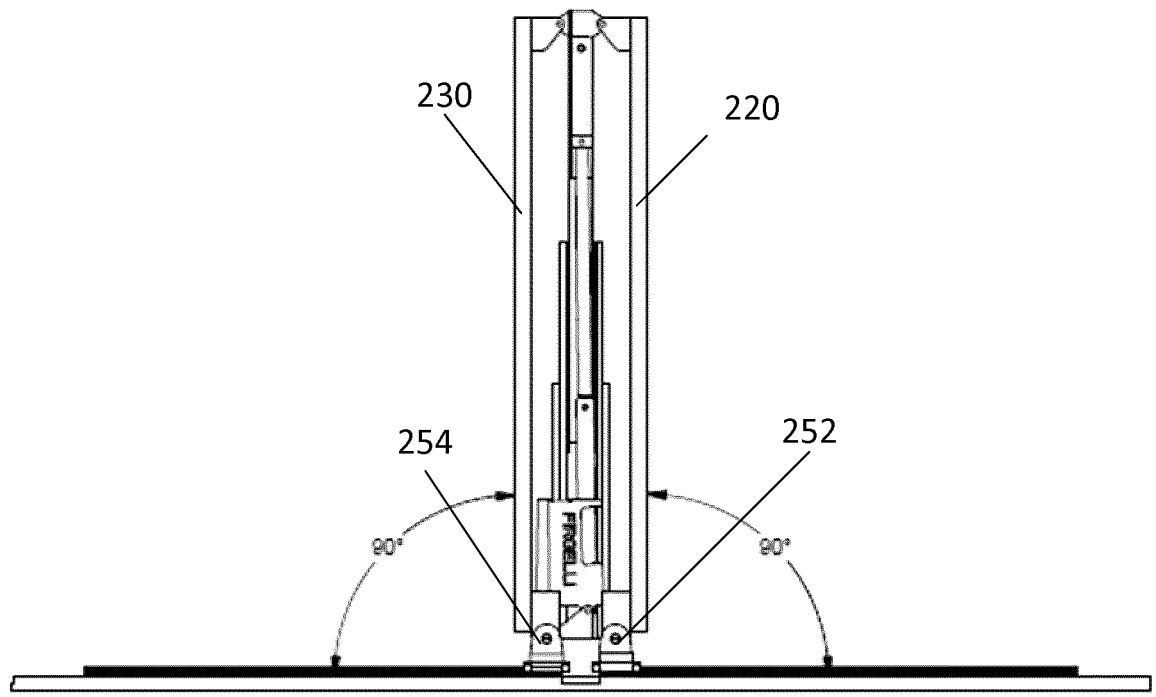
FIG. 5 illustrates a side view of the system of FIG. 3.

FIG. 3 illustrates the system of FIG. 2 with the two antennas 220 and 230 shown in an upright or vertical position. In a system according to an example embodiment of the present disclosure, each of the first and second antennas 220 and 230 is moveable between a plurality of operational positions. In an implementation, each of the first and second antennas is moveable between: a vertical operational position in which the first and second antennas are substantially orthogonal to the base (as shown in FIGS. 3 and 5), and a tilted operational position in which inner surfaces of the first and second antennas are at an acute angle of elevation with reference to a center of the base (as shown in FIGS. 2 and 4). While FIG. 2 through FIG. 5 show the first and second antennas in upright and tilted positions of about 45 degrees, in an embodiment the first and second antennas are moveable between operational positions anywhere between 0 degrees and 90 degrees, or anywhere between upright and horizontal.

FIG. 4 illustrates a side view of the system of FIG. 2 in which additional system components are visible. The system 200 comprises an antenna position controller. As shown in FIGS. 4 and 5, in an example embodiment the antenna position controller comprises a first actuator 240 configured to move the first antenna 220 in position or elevation, or both; and a second actuator (not visible in FIGS. 4 and 5) configured to move the second antenna 230 in position or elevation, or both. In an implementation, one or both of the first and second actuators comprise a linear actuator. In an implementation, one or both of the first and second actuators comprise a hydraulic actuator.

In an example embodiment, the system 200 further comprises: a first actuator antenna connector 262 configured to couple the first actuator 240 to the first antenna 220, and a first actuator base connector 264 configured to couple the first actuator to the base. A second actuator antenna connector 266 is configured to couple the second actuator (obscured in FIGS. 4 and 5 by the first actuator) to the second antenna 230, while a second actuator base connector (not visible in FIGS. 4 and 5) is configured to couple the second actuator to the base. As shown in FIG. 5, when the first and second antennas 220 and 230 are in a vertical operating position, the first and second base plate connectors 252 and 254 engage with the slide rails at a position that is substantially collinear with the actuator base connectors. In an example embodiment, the system 200 further comprises telescoping slide rails configured to enable slideable movement of the first and second antennas. In an example embodiment, first and second telescoping slide rails 268 are coupled to the first and second actuators, respectively, to receive the first and second actuator antenna connectors 262 and 266.

Figure 6:
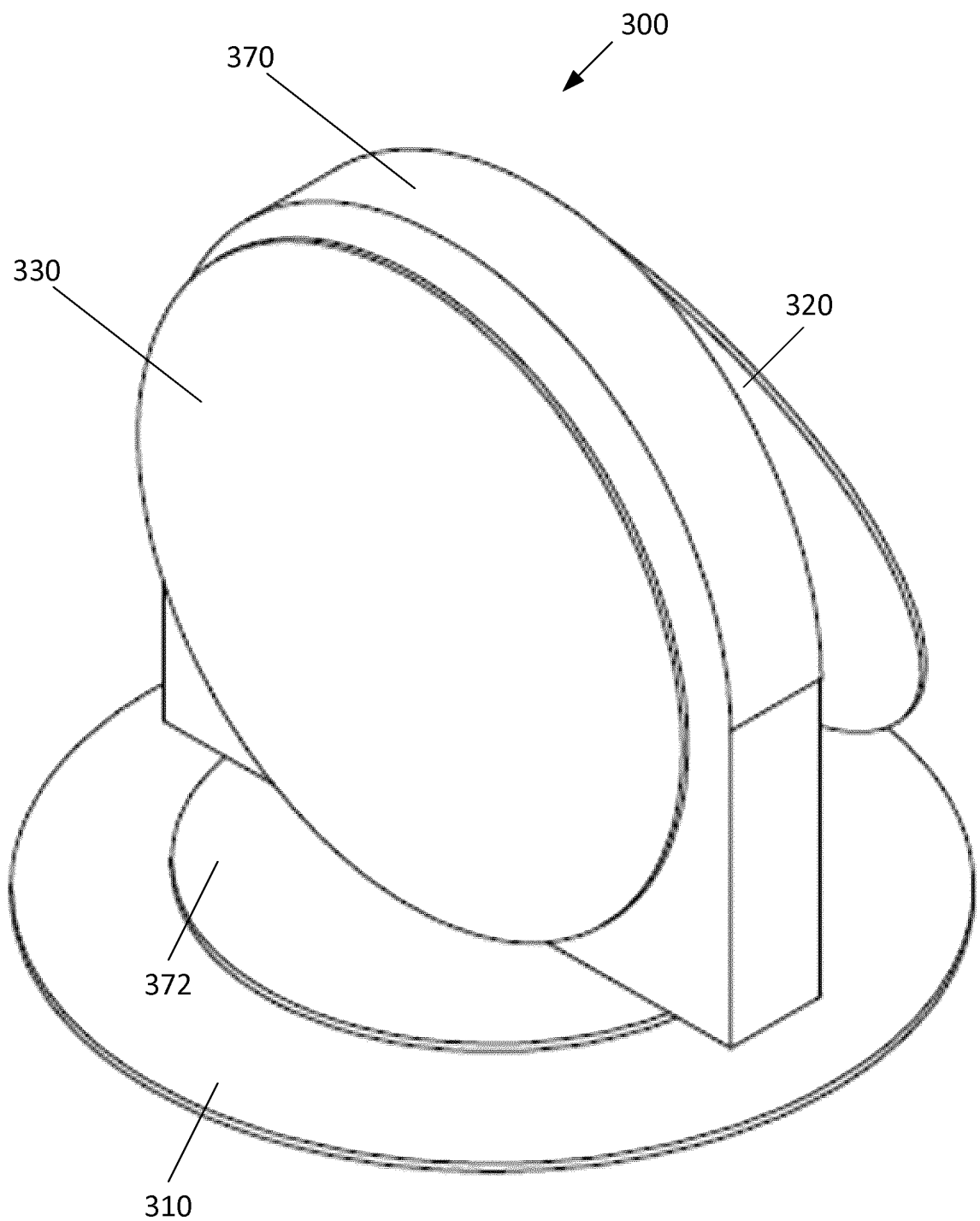
FIG. 6 illustrates a top perspective view of a RADAR antenna system according to an embodiment of the present disclosure having two antennas, with one antenna in a tilted position and one antenna in an upright position.

FIG. 6 illustrates a top perspective view of a RADAR antenna system 300 according to an embodiment of the present disclosure having two antennas and showing one antenna in a tilted position and one antenna in an upright position. The RADAR antenna system 300 comprises a base 310, a first antenna 320 and a second antenna 330. In the example embodiment shown in FIG. 6, each of the first and second antennas 320 and 330 comprises a solid flat plate antenna, for example a slotted waveguide. In another embodiment, the first and second antennas comprise a planar antenna or a patch antenna. In a further embodiment, the first antenna is of a different antenna type than the second antenna, and can have a different purpose, e.g. communications versus tracking. The first and second antennas 320 and 330 are each coupled to the base 310 so as to provide a common rotational axis for the first and second antennas. In an example embodiment, the first and second antennas 320 and 330 are configured to transmit independent first and second antenna beams, respectively. In another embodiment employing active antennas, each active antenna 320 and 330 can itself have 4 beams, generating 8 beams in total, which can increase performance by 16 times. Embodiments of the present disclosure provide advantages over known approaches, regardless of the type of antenna is used.

The system 300 comprises an enclosure. In an example embodiment, the enclosure is a RADAR transceiver enclosure 370 as illustrated in FIGS. 6-9. The RADAR transceiver enclosure 370 houses RADAR electronics, including a RADAR transceiver, and couples to the base 310. In an example embodiment, the RADAR transceiver enclosure 370 houses the RADAR electronics and the azimuth rotator. In the example embodiment of FIG. 6, the first and second antennas 320 and 330 are coupled to the RADAR transceiver enclosure 370 so as to provide indirect coupling to the base 310. This is in contrast to the embodiment of FIG. 2 through FIG. 5 in which the first and second antennas are coupled to the base using an antenna base connector, such as the horizontal track(s). In an example embodiment, the RADAR transceiver enclosure 370 is indirectly coupled to the base 310, such as via a transceiver enclosure base connector 372. In an embodiment, the azimuth rotator is housed underneath the RADAR transceiver enclosure 370, for example under the transceiver enclosure base connector 372, or elsewhere under the base 310. In the embodiment of FIG. 6, the first and second antennas 320 and 330 are not coupled directly to the base 310.

Figure 7:
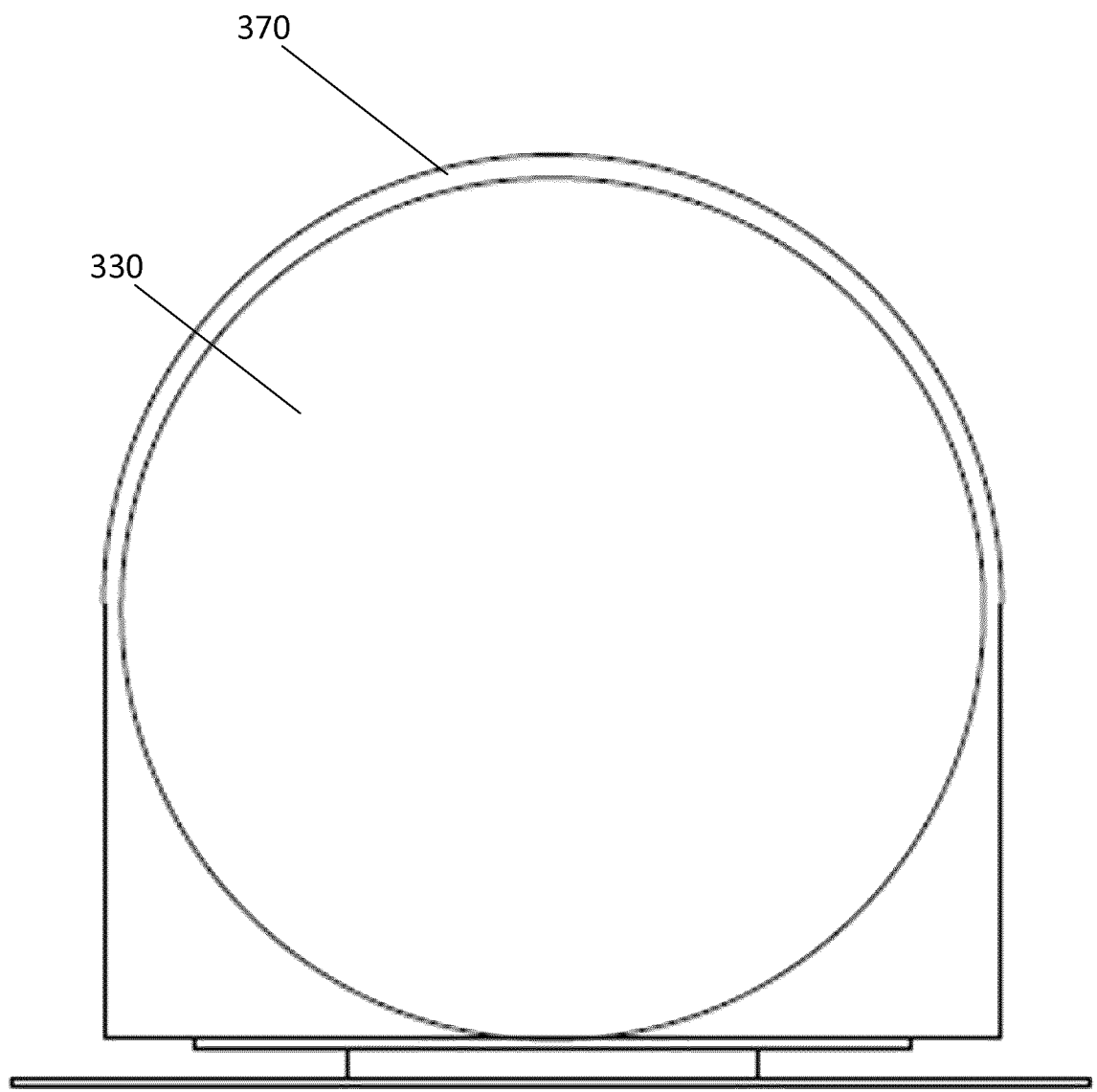
FIG. 7 illustrates a front view of FIG. 6.

FIG. 7 illustrates a front view of FIG. 6. As shown in FIG. 7, in an example embodiment the RADAR transceiver enclosure 370 has a physical shape and profile similar to the shape and profile of the first and second antennas 320 and 330. In an example embodiment, the physical shape and profile of the RADAR transceiver enclosure 370 enables a reduction in the radiative coupling between the first and second antennas 320 and 330. The reduced radiative coupling, or increased electromagnetic isolation, provided by the RADAR transceiver enclosure 370 is helpful, for example when one antenna is in transmit mode and the other antenna is in receive mode. In an example implementation of a monopulse system, one antenna will look up and the other will perform the tracking. In those cases, the hinges will provide full range of motion, rather than the restricted motion shown in FIGS. 6 and 7. In an example embodiment, the two antennas operate in completely different bands. In an example embodiment, the two antennas have two different antenna technologies, e.g. one providing communications capability and the other providing tracking capability. In an example embodiment, a dual polar implementation is used for a weather RADAR.

Figure 8:
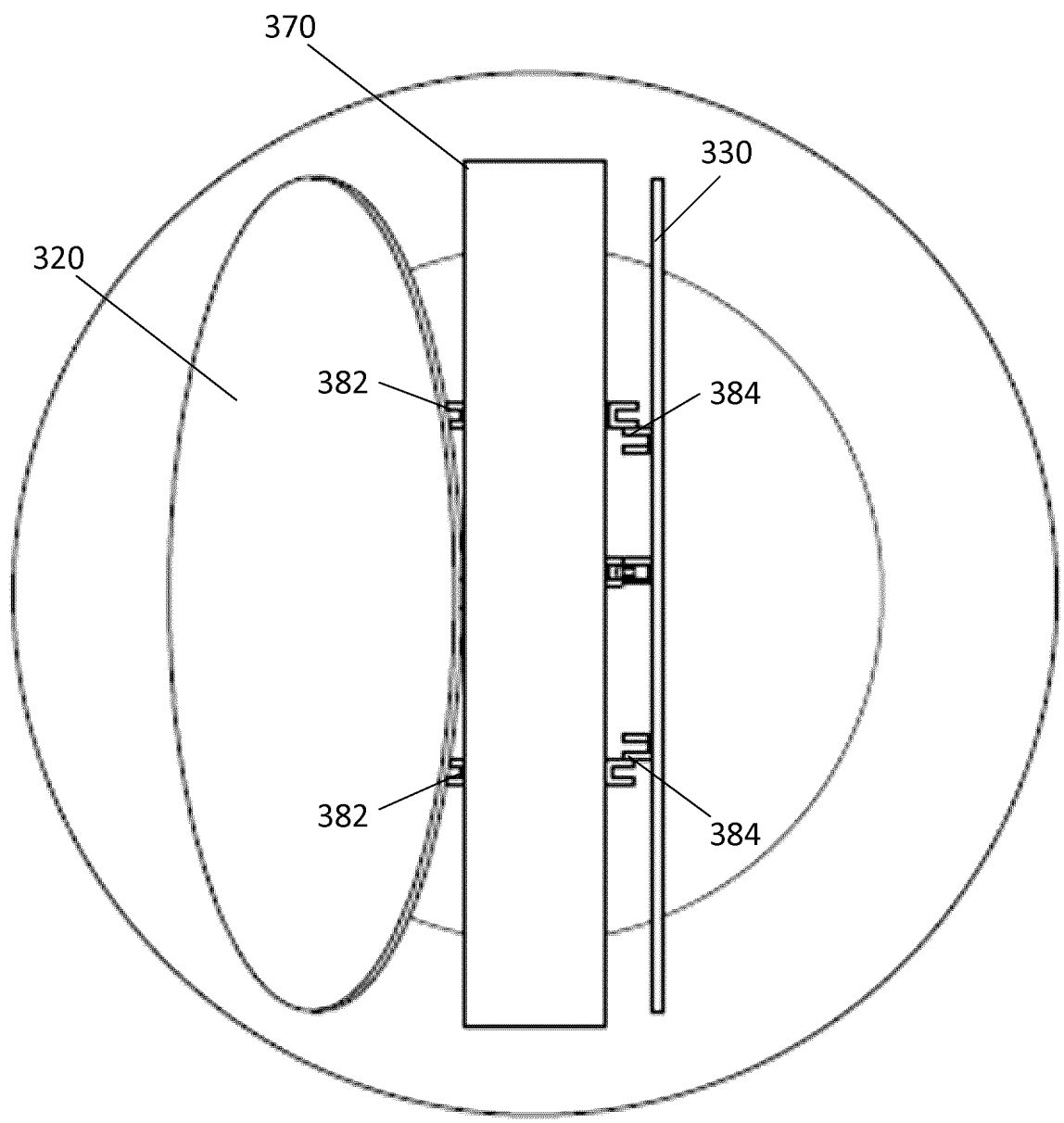
FIG. 8 illustrates a top view of FIG. 6.

FIG. 8 illustrates a top view of FIG. 6 in which additional system components are visible. In an embodiment, one or more first antenna mounting connectors 382 are configured to couple the first antenna 320 to the RADAR transceiver enclosure 370. In the example embodiment of FIG. 8, a pair of first antenna mounting connectors 382 are configured to couple the first antenna 320 to the RADAR transceiver enclosure 370. In an embodiment, one or more second antenna mounting connectors 384 are configured to couple the second antenna 330 to the RADAR transceiver enclosure 370. In the example embodiment of FIG. 8, a pair of second antenna mounting connectors 384 are configured to couple the second antenna 330 to the RADAR transceiver enclosure 370, for example by means of a hinge.

Figure 9:
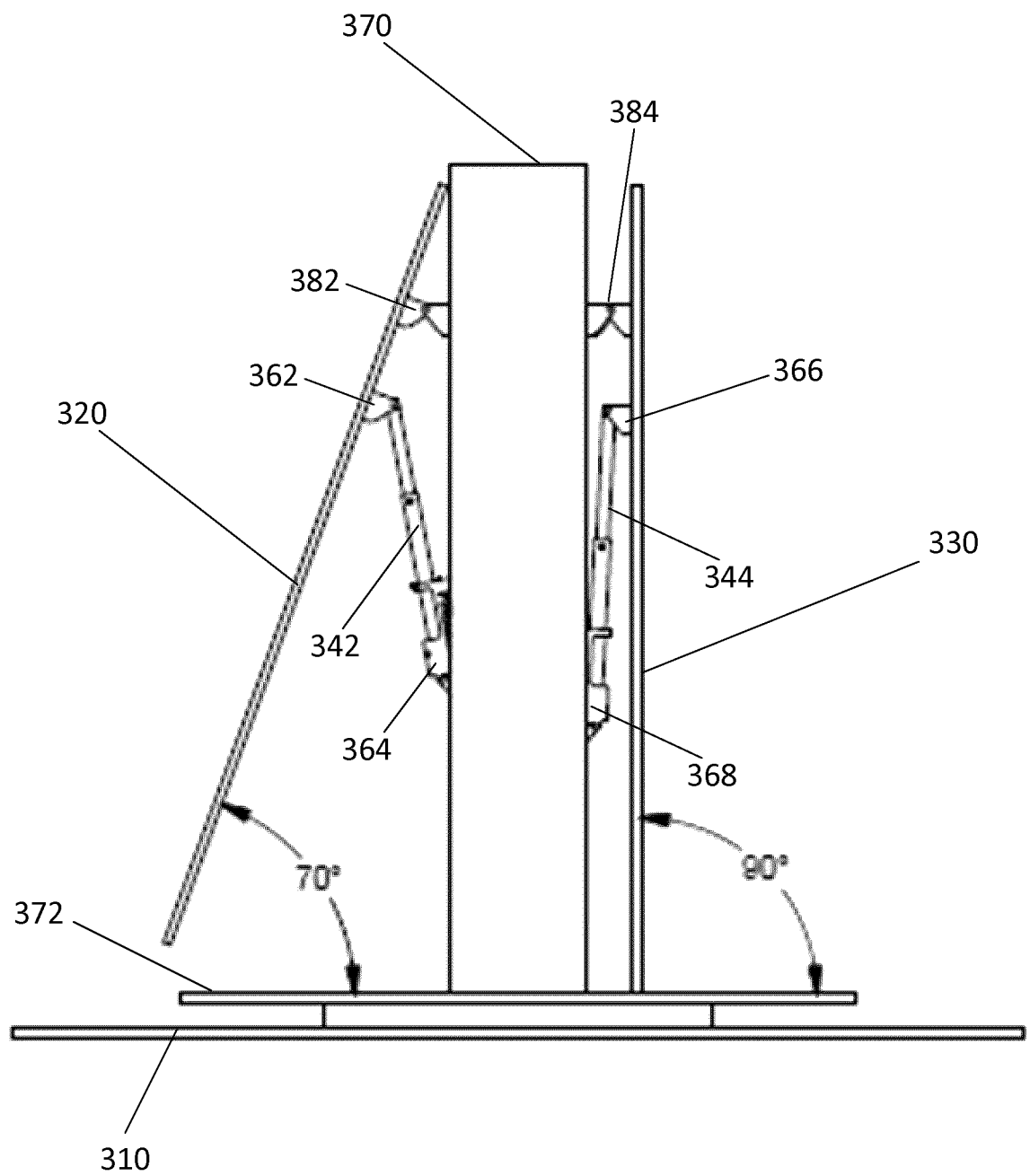
FIG. 9 illustrates a side view of FIG. 6.

FIG. 9 illustrates a side view of FIG. 6 in which additional system components are visible. The system 300 comprises an antenna position controller. As shown in FIG. 9, in an example embodiment the antenna position controller comprises a first actuator 342 configured to move the first antenna 320 in position or elevation, or both; and a second actuator 344 configured to move the second antenna 330 in position or elevation, or both. In an implementation, one or both of the first and second actuators comprise a linear actuator. In an implementation, one or both of the first and second actuators comprise a hydraulic actuator.

In an example embodiment, the system 300 further comprises: a first actuator antenna connector 362 configured to couple the first actuator 342 to the first antenna 320, and a first actuator enclosure connector 364 configured to couple the first actuator to the RADAR transceiver enclosure 370. A second actuator antenna connector 366 is configured to couple the second actuator 344 to the second antenna 330, while a second actuator enclosure connector 368 is configured to couple the second actuator to the RADAR transceiver enclosure 370. As shown in FIG. 9, the first antenna 320 is in a tilted operating position and the second antenna 320 is in an upright or vertical operating position.

While the example embodiment of FIG. 9 illustrates the first antenna 320 in a tilted operating position of an angle of about 70 degrees from the base, and the second antenna is in a vertical operating position substantially perpendicular to the base, in other embodiments the first and second antennas 320 and 330 are in other operating positions anywhere from perpendicular to the base to parallel to the base.

In the example embodiment of FIG. 6 through FIG. 9, the first and second antennas 320 and 330 are coupled to the RADAR transceiver enclosure 370 by means of a hinge. An antenna elevation, or antenna height, associated with the first and second antennas 320 and 330 is substantially unchanged when the antennas are moved from a first operating position to a second operating position, since the hinges 382 and 384 maintain the tops of the first and second antennas at substantially the same height. This is in contrast to the embodiment of FIG. 2 through FIG. 5 in which the first and second antennas are coupled to the base and to the actuator by way of slide rails or similar elements permitting a change in the elevation of the first and second antennas and translation of the first and second antennas during such change in elevation.

The example embodiments of the present disclosure have thus far described a RADAR antenna system comprising first and second antennas and a base. In another embodiment, the present disclosure provides a RADAR antenna system comprising a base and a plurality of antennas configured to transmit at least two independent antenna beams. The plurality of antennas are each coupled to the base so as to provide a common rotational axis. An antenna position controller is configured to independently control a transmission position associated with each of the plurality of antennas.

Figure 10:
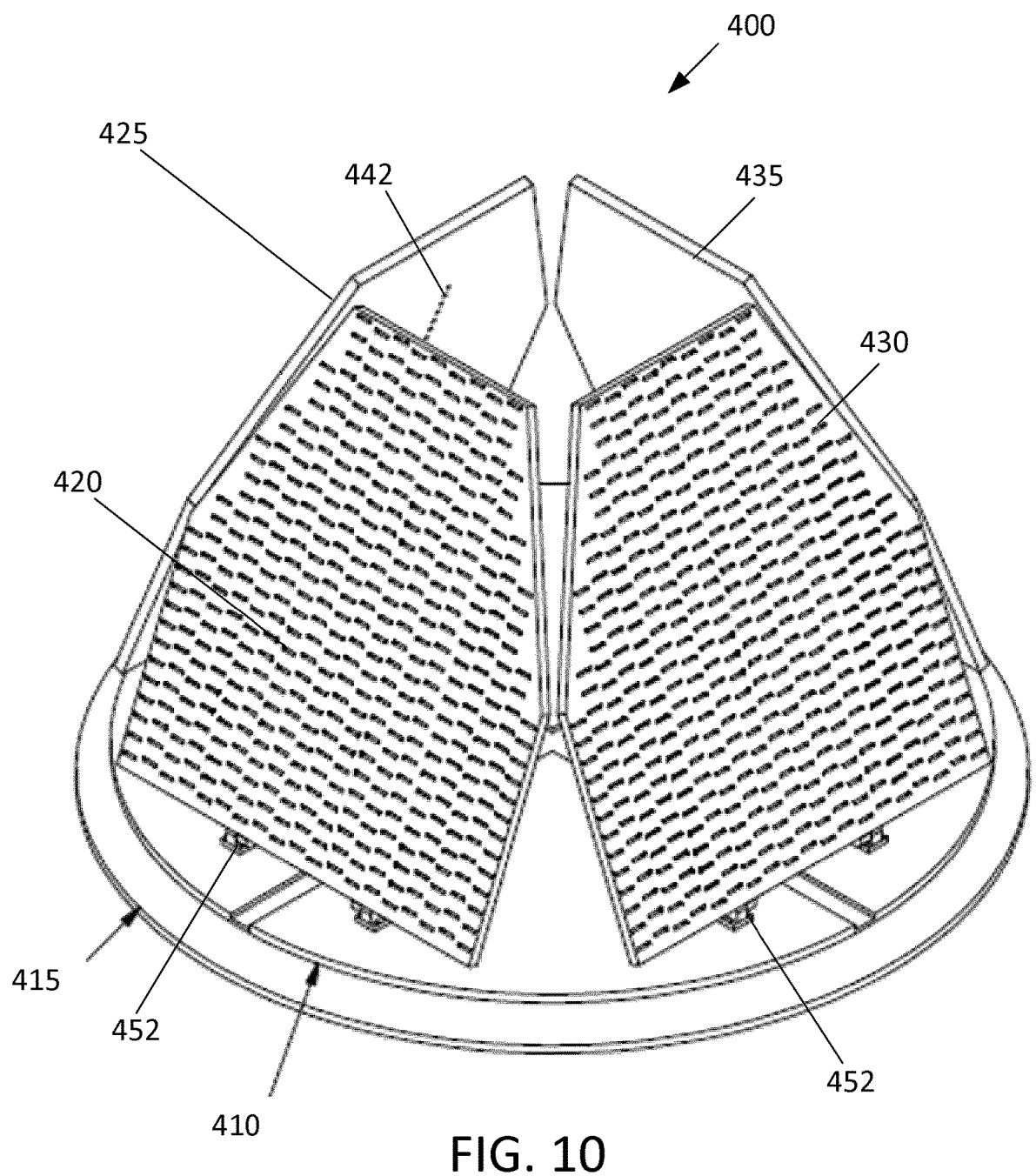
FIG. 10 illustrates a top perspective view of a RADAR antenna system according to an embodiment of the present disclosure having four antennas shown in a tilted position.

FIG. 10 illustrates a top perspective view of a RADAR antenna system 400 according to an embodiment of the present disclosure having four antennas shown in a tilted position. In an embodiment having four antennas, four antenna beams of the same or different frequencies can be transmitted. In an implementation using substantially identical beam frequencies, the scan rate will increase four fold over that achievable with a single beam. It is also an advantage of embodiments of the present disclosure that the four fold scan rate is achieved without an increase in the rotational rate of the antenna. This has advantage in terms of rotator reliability as a system can be operated at a one quarter the speed of a single beam system. In addition, the rotational rate of the antenna can introduce ground clutter at frequencies associated with the rotational rate of the antenna. Reduction in the antenna rotation speed lowers the Doppler frequency associated with the ground clutter improving the RADAR sensitivity to slow moving targets.

In the example embodiment of FIG. 10, the four antennas 420, 425, 430 and 435 each have a pyramidal hexagon shape, though other shapes can be used. Compared to the standard circular antenna shape, the pyramidal hexagon shape of the embodiment of FIG. 10 can be advantageous with respect to side lobe reduction. The pyramidal hexagon antenna shape in FIG. 10 also provides additional surface area and increased number of slots when compared to a circular antenna, and the flat edges of the antenna engage with each other in a closed position, making efficient use of antenna real estate. The isosceles trapezoidal antenna shape of the embodiment in FIG. 15, to be described in detail later, has similar advantages. In an embodiment, at least one of antennas defines a plurality of actuator engagement points at which an antenna connector can be coupled, or is couplable, to the antenna. In the example embodiment of FIG. 10, the second antenna 425 defines a plurality of actuator engagement points 442 at which a second actuator antenna connector can be coupled, or is couplable, to the second antenna 425. In an example embodiment, the plurality of actuator engagement points are provided at different heights along a vertical axis of the second antenna when the second antenna is in an upright position.

In the example embodiment of FIG. 10, a radome (radar dome) mounting plate 415 is provided to facilitate mounting of a radome, which is an enclosure for protecting a radar antenna. A radome is typically constructed of a material that has minimal signal attenuation and protects the antenna from weather and other undesirable disturbance that may affect proper antenna operation. An antenna mounting plate 410 is provided on which the antennas are to be mounted. In the example embodiment of FIG. 10, the antenna mounting plate 410 defines slots to control the side lobes of the antenna beam, which are communication paths into the radar.

In the example embodiment of FIG. 10, the system 400 comprises a plurality of base antenna connectors 452 configured to couple each of each of the antennas 420, 425, 430 and 435 to the base or antenna mounting plate 410. In an example embodiment, the antenna mounting plate 410 and the radome mounting plate 415 spin relative to each other. In an example embodiment, the base antenna connectors 452 connect the antennas to the base 410 with a fixed hinge such that the antenna is moveable in inclination, or tilt, without changing position with respect to the connection position on the base.

Figure 11:
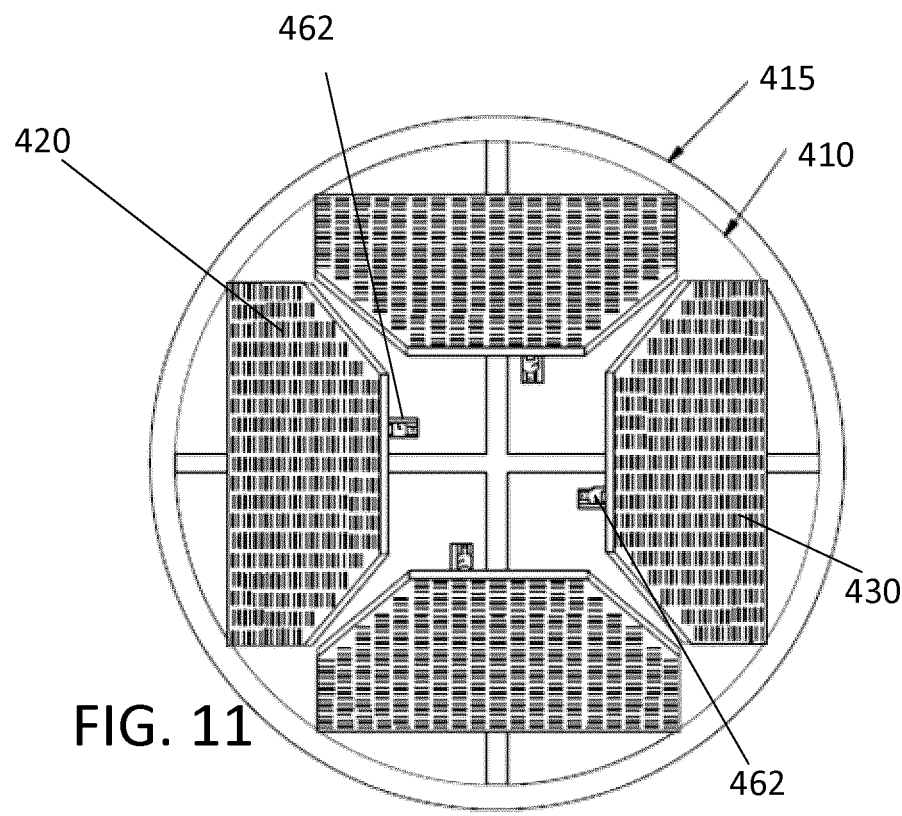
FIG. 11 illustrates a top view of FIG. 10.
Figure 12:
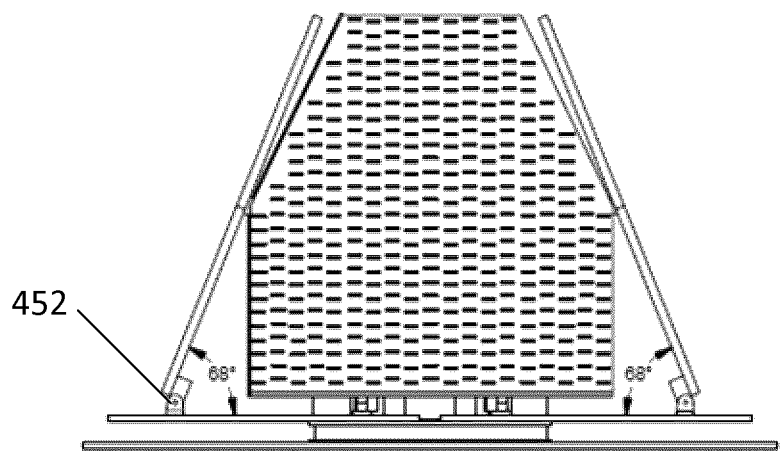
FIG. 12 illustrates a side view of FIG. 10.
Figure 13:
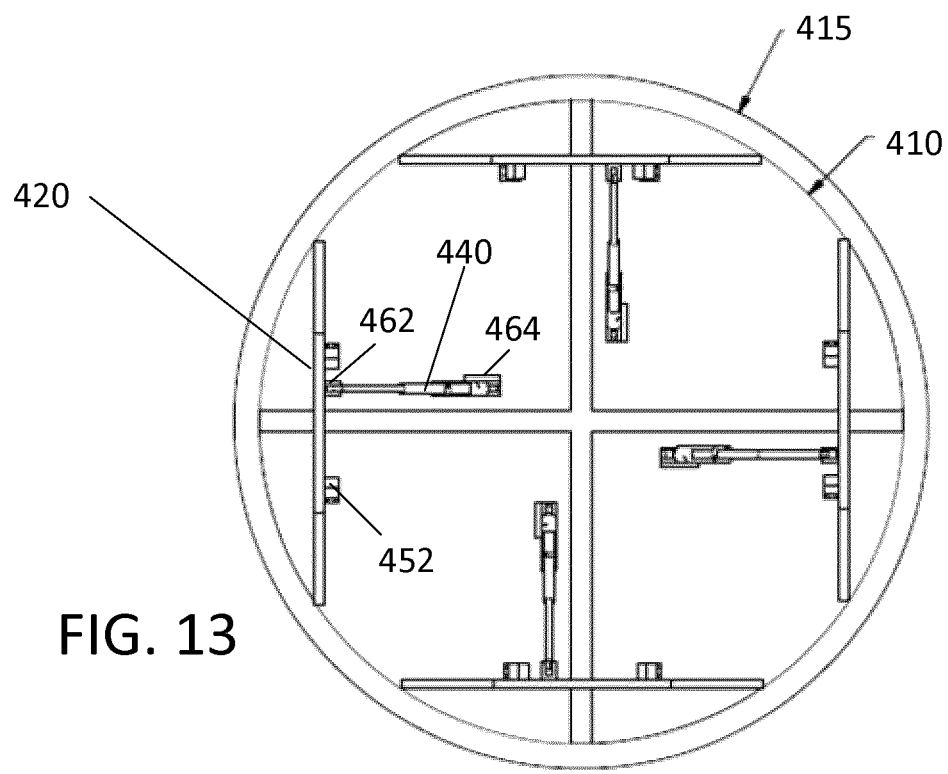
FIG. 13 illustrates a top view of the system of FIG. 10 with the four antennas in an upright position.
Figure 14:
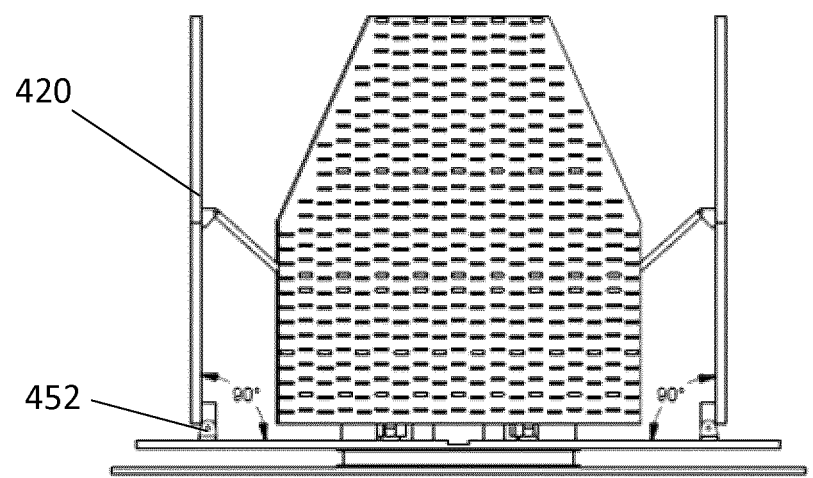
FIG. 14 illustrates a side view of the system of FIG. 13.

FIGS. 11 and 12 illustrate top and side views, respectively, of FIG. 10 with the antennas in a tilted position. FIGS. 13 and 14 illustrate top and side views, respectively, of the system of FIG. 10 with the four antennas in an upright position. As shown in FIGS. 11 and 13, in an example embodiment, the system 400 further comprises actuator antenna connectors 462 configured to couple an actuator 440 to each antenna, such as antenna 420. Actuator base connectors 464 are configured to couple the actuator 440 to the base. The antenna base connectors 452 are also seen in FIGS. 12, 13 and 14.

In the example embodiment of FIG. 10 through FIG. 14, the antennas 420, 425, 430 and 435 are coupled to the base with a fixed hinge and to the respective actuators with a fixed hinge. An antenna elevation, or antenna height, associated with the antennas 420, 425, 430 and 435 is substantially unchanged when the antennas are moved from a first operating position to a second operating position, since the antenna base connectors 452 maintain the antennas coupled to the same connection positions on the base 410.

Figure 15:
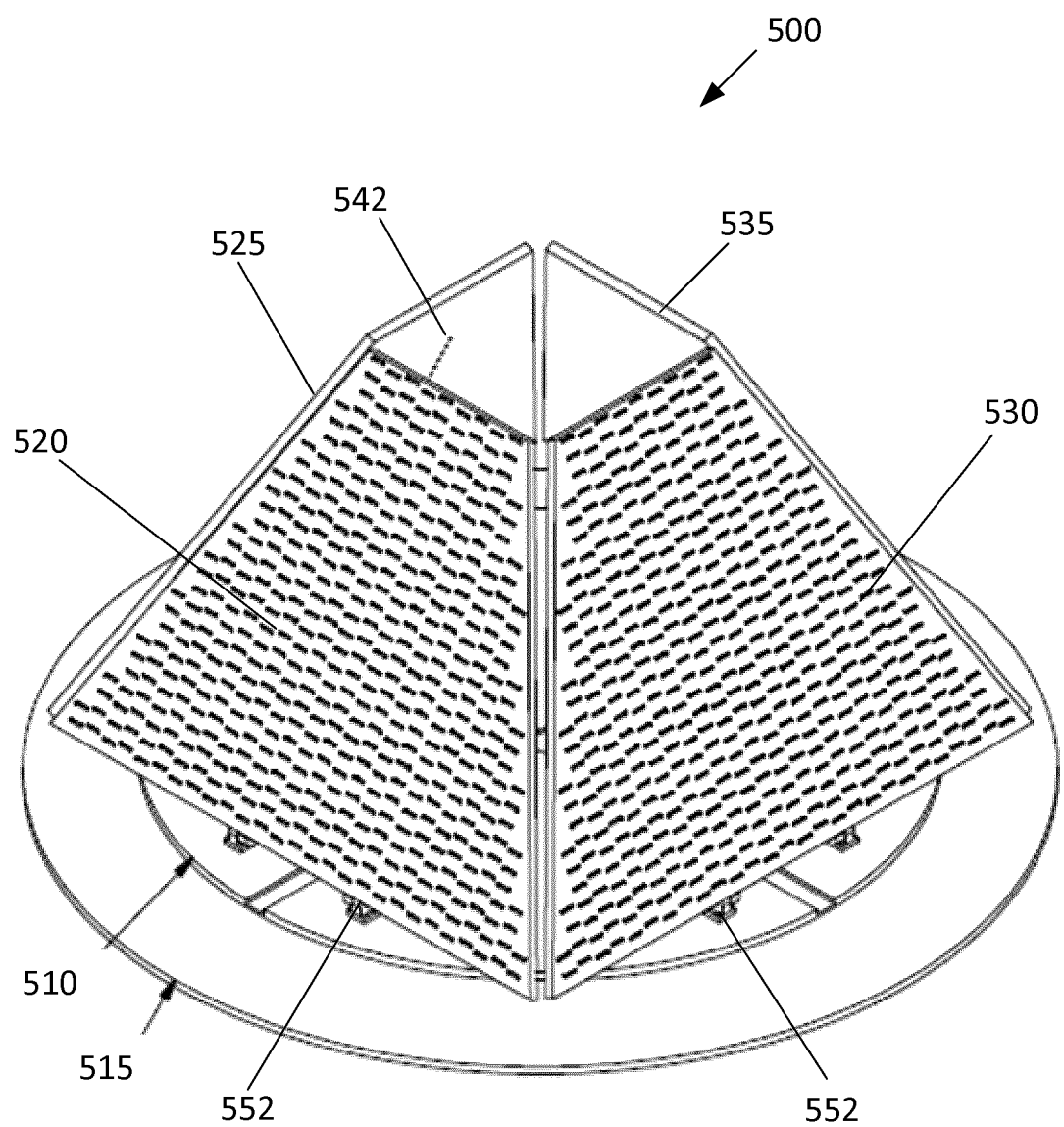
FIG. 15 illustrates a top perspective view of a RADAR antenna system according to another embodiment of the present disclosure having four antennas shown in a tilted position.

FIG. 15 illustrates a top perspective view of a RADAR antenna system 500 according to another embodiment of the present disclosure having four antennas shown in a tilted position. In the example embodiment of FIG. 15, the four antennas 520, 525, 530 and 535 each have an isosceles trapezoidal shape, though other shapes can be used. The antenna shapes used in embodiments of the present disclosure, including the shape in FIG. 15, are primarily used to allow maximum tilt angle and maximum antenna physical aperture. In some embodiments, such antennas will also provide increased side lobe suppression. In an embodiment, at least one of antennas defines a plurality of actuator engagement points at which an antenna connector is couplable to the antenna. In the example embodiment of FIG. 15, the second antenna 525 defines a plurality of actuator engagement points 542 at which a second antenna connector is couplable to the second antenna 525. In an example embodiment, the plurality of actuator engagement points are provided at different heights along a vertical axis of the second antenna when the second antenna is in an upright position. Similar to FIG. 10, in the example embodiment of FIG. 15, a radome mounting plate 515 is provided to facilitate mounting of a radome, while the antennas are mounted on the antenna mounting plate 510, or base.

In the example embodiment of FIG. 15, the system 500 comprises a plurality of base antenna connectors 552 configured to couple each of the antennas 520, 525, 530 and 535 to the base or antenna mounting plate 510. In an example embodiment, the base antenna connectors 552 connect the antennas to the base using a hinge such that the antenna is moveable in inclination without changing the connection position on the base.

Figure 16:
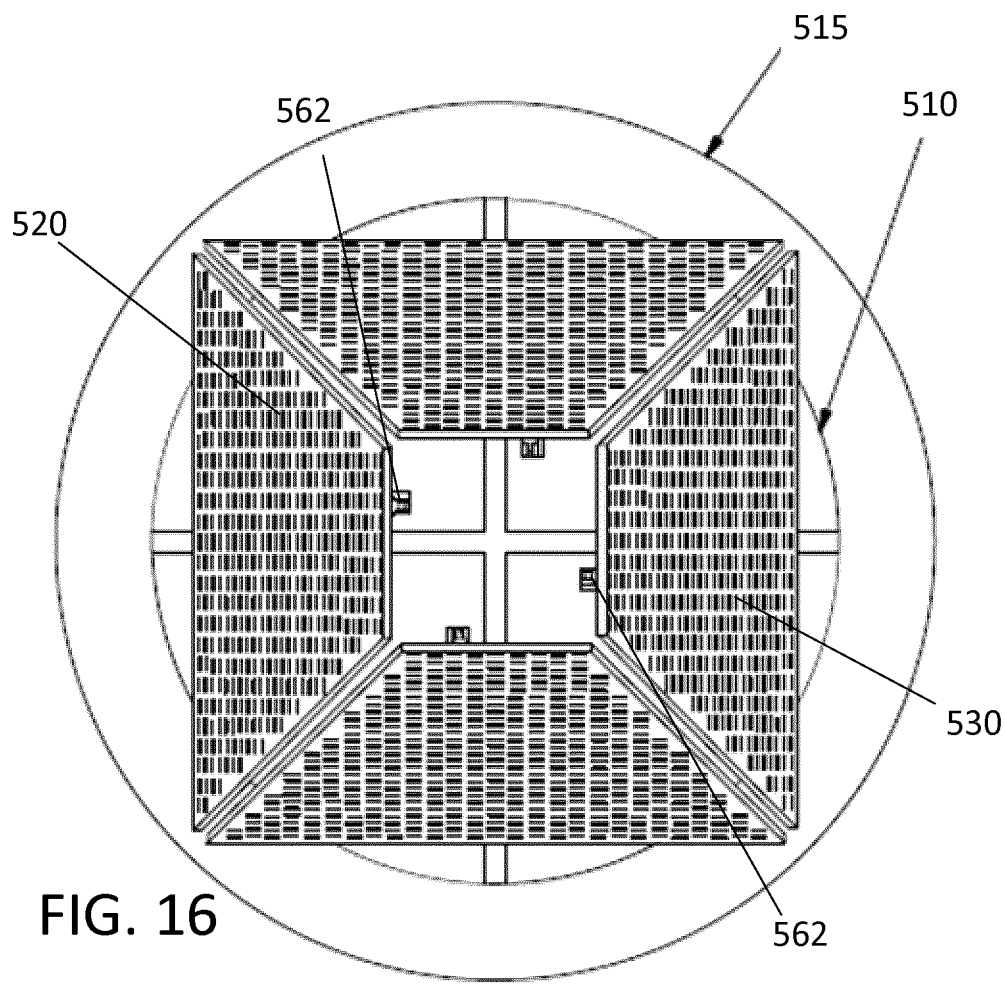
FIG. 16 illustrates a top view of FIG. 15.
Figure 17:
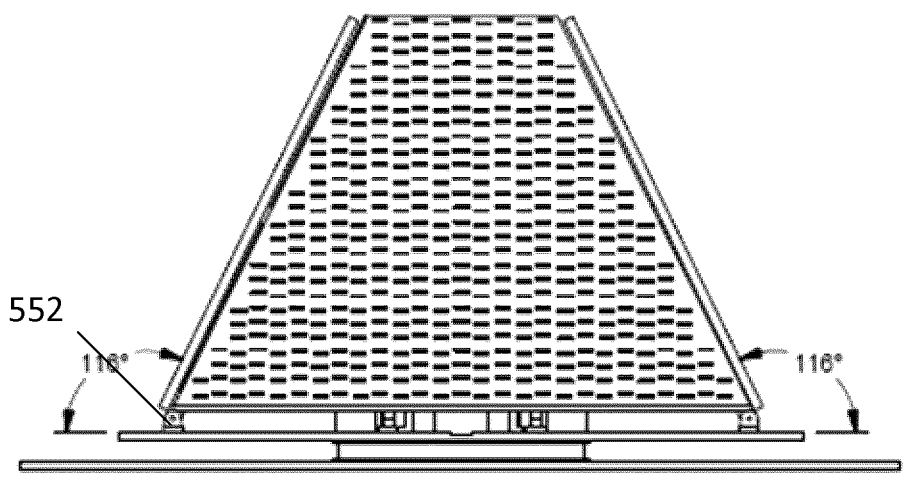
FIG. 17 illustrates a side view of FIG. 15.
Figure 18:
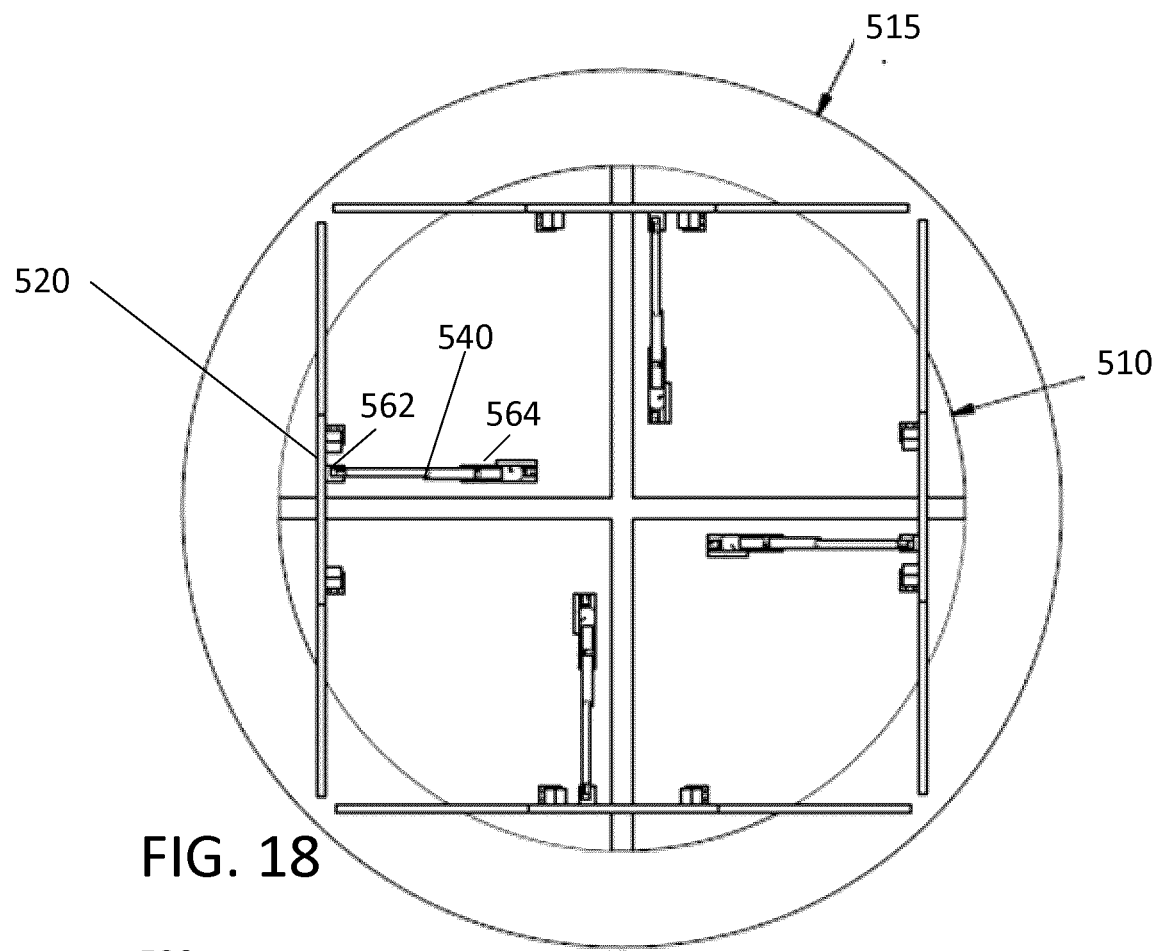
FIG. 18 illustrates a top view of the system of FIG. 15 with the four antennas in an upright position.
Figure 19:
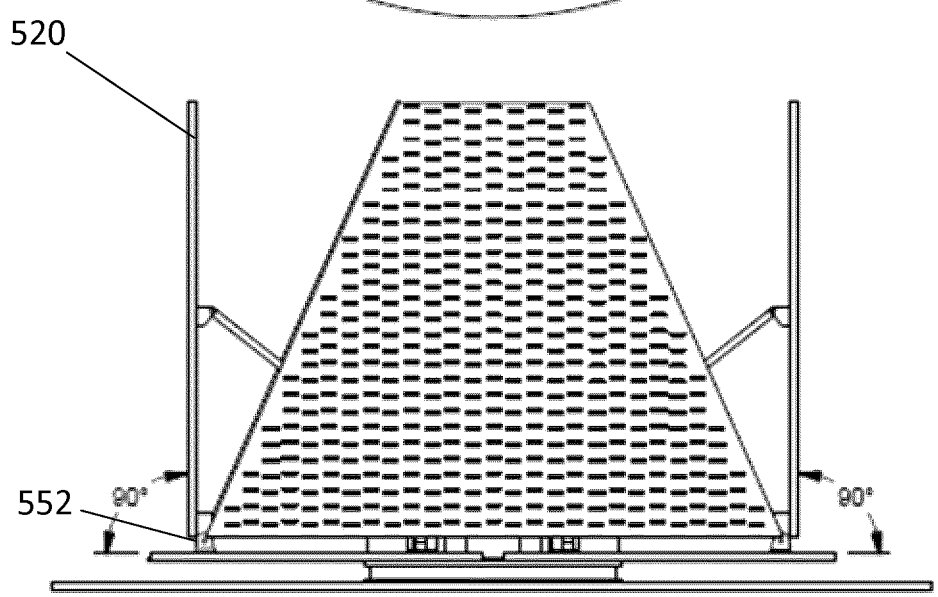
FIG. 19 illustrates a side view of the system of FIG. 18.

FIGS. 16 and 17 illustrate top and side views, respectively, of FIG. 15 with the antennas in a tilted position. FIGS. 18 and 19 illustrate top and side views, respectively, of the system of FIG. 15 with the four antennas in an upright position. As shown in FIGS. 16 and 18, in an example embodiment, the system 500 further comprises actuator antenna connectors 562 configured to couple an actuator 540 to each antenna, such as antenna 520. Actuator base connectors 564 are configured to couple the actuator 540 to the base. The antenna base connectors 552 are also seen in FIGS. 17, 18 and 19.

In the example embodiment of FIG. 15 through FIG. 19, the antennas 520, 525, 530 and 535 are coupled to the base using a fixed hinge and to the respective actuators using a fixed hinge. An antenna elevation, or antenna height, associated with the antennas 520, 525, 530 and 535 is substantially unchanged when the antennas are moved from a first operating position to a second operating position. This is similar to the embodiment in FIG. 6 through FIG. 9 and the embodiment in FIG. 10 through FIG. 15, and in contrast to the embodiment of FIG. 2 through FIG. 5 in which the first and second antennas are coupled to the base and to the actuator by way of slide rails or similar elements permitting a change in the elevation of the first and second antennas and translation of the first and second antennas during such change in elevation.

FIG. 20 through FIG. 24 illustrate an additional embodiment showing a quad plate folding antenna. In an example embodiment, the quad flat folding implementation maximizes tilt angle and range while providing an added advantage of the antenna folding away to a flat storable geometry.

Figure 20:
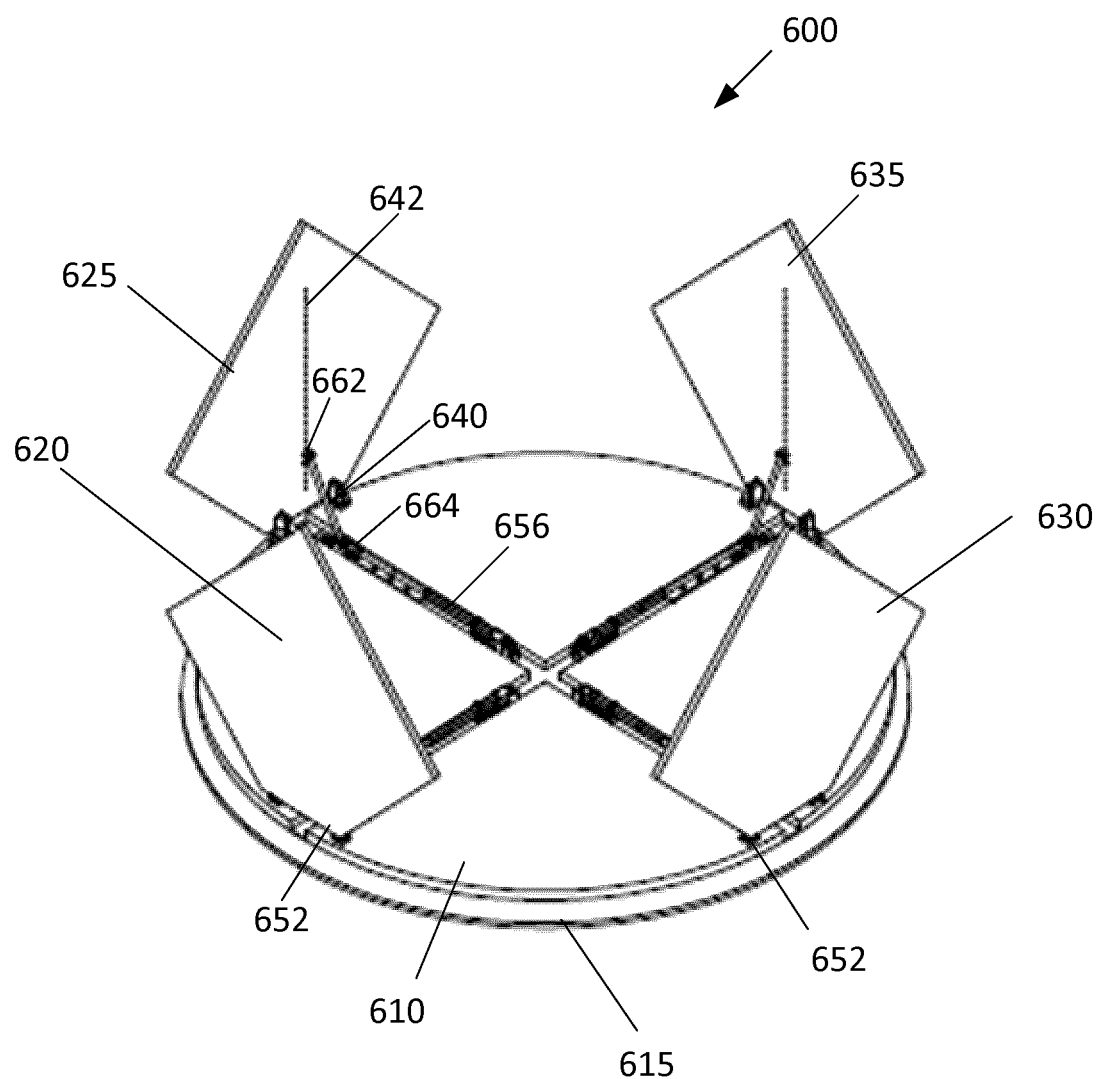
FIG. 20 illustrates a top perspective view of a RADAR antenna system according to another embodiment of the present disclosure having four antennas shown in a vertical position.

FIG. 20 illustrates a top perspective view of a RADAR antenna system 600 according to another embodiment of the present disclosure having four antennas shown in a vertical position. In the example embodiment of FIG. 20, the four antennas 620, 625, 630 and 635 each have diamond or square shape, with one corner cut off as shown, though other shapes can be used. In an embodiment, at least one of antennas defines a plurality of actuator engagement points at which an antenna connector is couplable to the antenna. In the example embodiment of FIG. 20, the second antenna 625 defines a plurality of actuator engagement points 642 at which a second antenna connector is couplable to the second antenna 625. In an example embodiment, the plurality of actuator engagement points are provided at different heights along a vertical axis of the second antenna when the second antenna is in an upright position. Similar to FIGS. 10 and 15, in the example embodiment of FIG. 20, a radome mounting plate 615 is provided to facilitate mounting of a radome, while the antennas are mounted on the antenna mounting plate 610, or base.

In the example embodiment of FIG. 20, the system 600 comprises a plurality of base antenna connectors 652 configured to couple each of each of the antennas 620, 625, 630 and 635 to the base or antenna mounting plate 610, for example using a hinge. In an example embodiment, the base antenna connectors 652 connect the antennas to the base such that the antenna is moveable in inclination without changing position with respect to the connection position on the base.

As shown in FIG. 20, the plurality of actuator base connectors 664 are configured to adjustably couple the actuators 640 to the base. In an example embodiment, the actuator base connectors comprise ball bearing carriages. In an example embodiment, the system 600 comprises a plurality of base engagement members 656, for example a horizontal track, configured to facilitate adjustable engagement of the actuator base connectors to the base 610. In an example embodiment, the base engagement members 656 comprise a plurality of linear slide rails configured to receive the plurality of actuator base connectors 664, for example a plurality of ball bearing carriages.

In FIG. 20, the actuator base connectors 664 enable adjustable engagement of the actuators 640 with the base 610, for example on slide rails, while the base antenna connectors 652 enable fixed engagement with the base, for example using a hinge. This is in contrast to FIG. 4 in which the base antenna connectors 252 and 254 are configured to facilitate adjustable engagement of the antennas 220 and 230 with the base 210, for example on slide rails, while the actuator base connectors 264 enable fixed engagement with the base, for example using a hinge.

Figure 21:
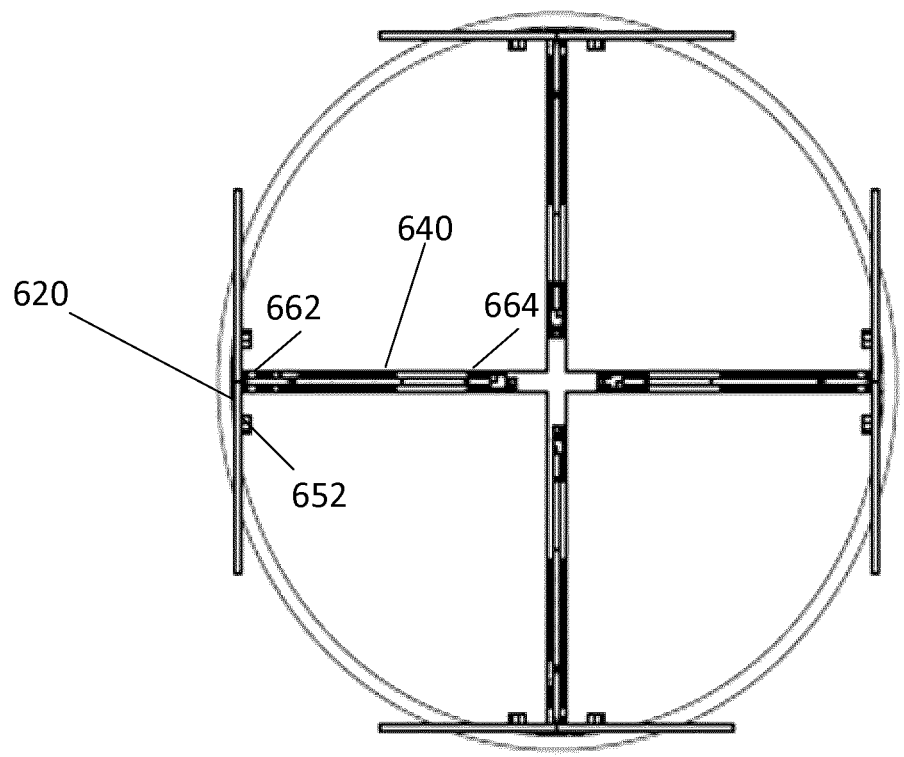
FIG. 21 illustrates a top view of FIG. 20.
Figure 22:
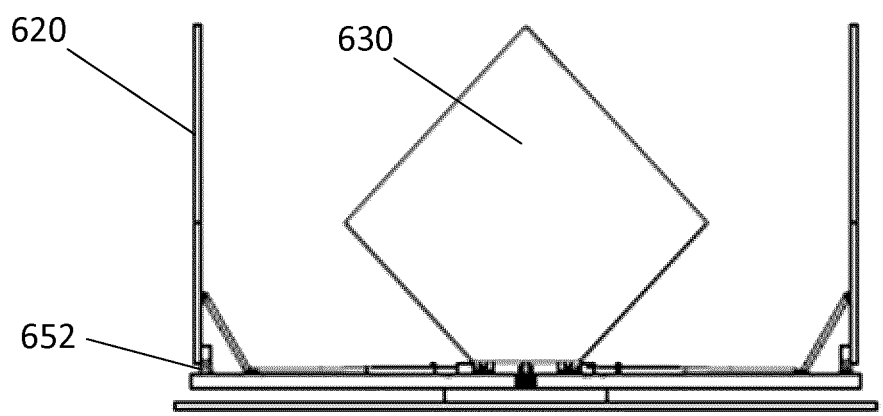
FIG. 22 illustrates a side view of FIG. 20.
Figure 23:
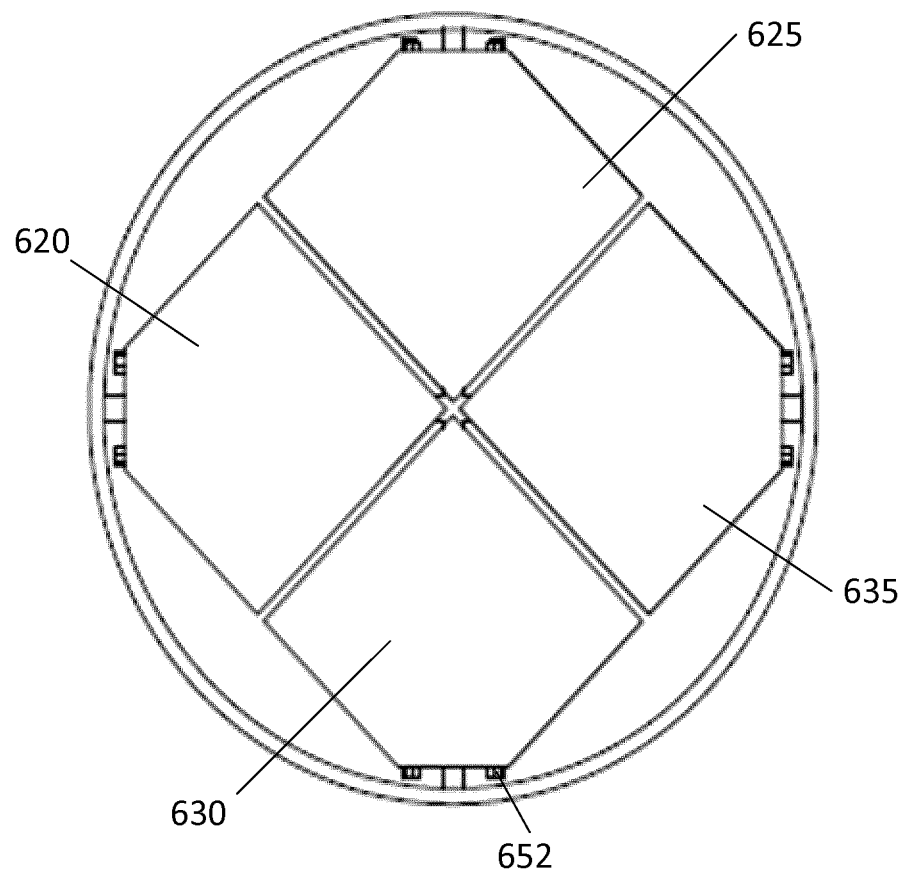
FIG. 23 illustrates a top view of the system of FIG. 20 with the four antennas in a horizontal position.
Figure 24:
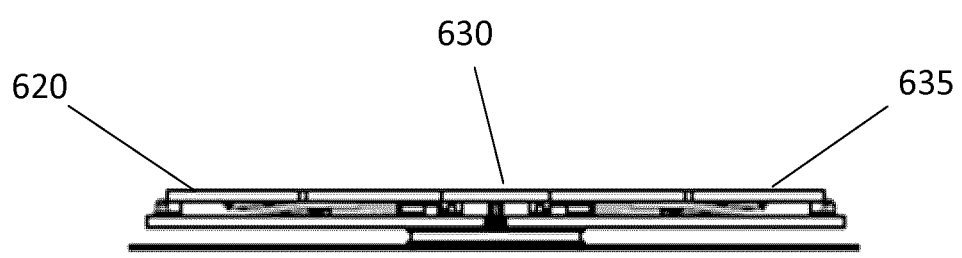
FIG. 24 illustrates a side view of the system of FIG. 23.

FIGS. 21 and 22 illustrate top and side views, respectively, of FIG. 20 with the antennas in an upright or vertical position. FIGS. 23 and 24 illustrate top and side views, respectively, of the system of FIG. 20 with the four antennas in a horizontal or flat position. As shown in FIGS. 21 and 23, in an example embodiment, the system 600 further comprises actuator antenna connectors 662 configured to couple an actuator 640 to each antenna, such as antenna 620. Actuator base connectors 664 are configured to couple the actuator 640 to the base. The antenna base connectors 652 are also seen in FIGS. 21, 22 and 23.

In the example embodiment of FIG. 20 through FIG. 24, the antennas 620, 625, 630 and 635 are moveable between a fully vertical operating position and a fully horizontal operating position, such that in the fully horizontal operating position shown in FIG. 23 and FIG. 24, the system 600 is easily folded away and stored in a configuration that takes up a small amount of space compared to other implementations.

Figure 25:
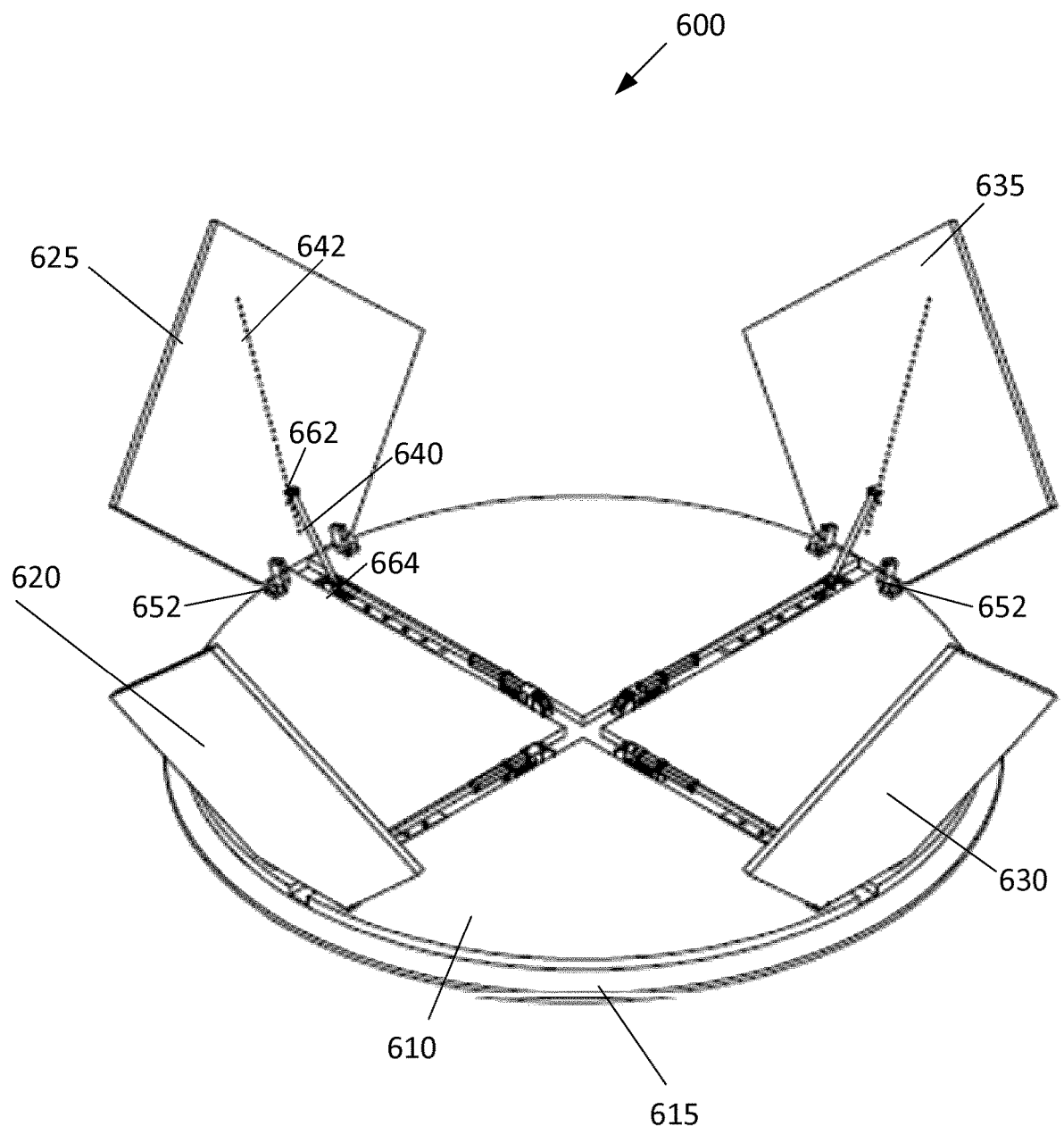
FIG. 25 illustrates a top perspective view of the system of FIG. 20 with the four antennas shown in a negative declination position.
Figure 26:
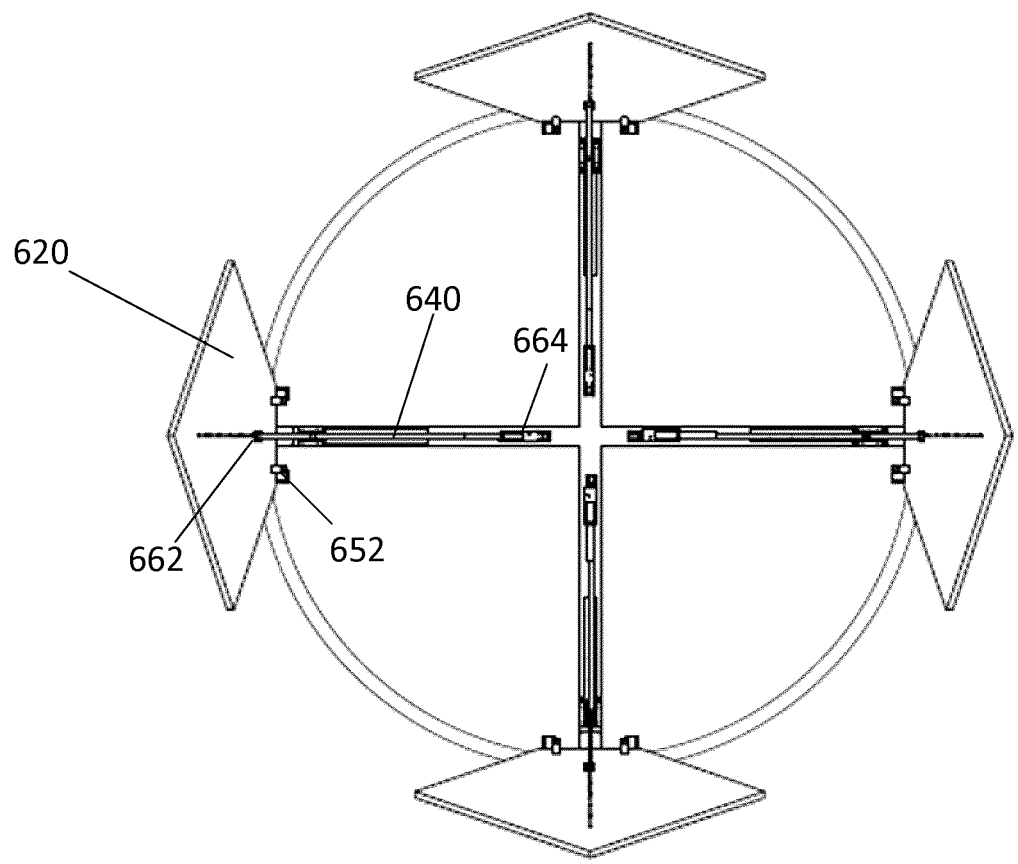
FIG. 26 is a top view of FIG. 25.
Figure 27:
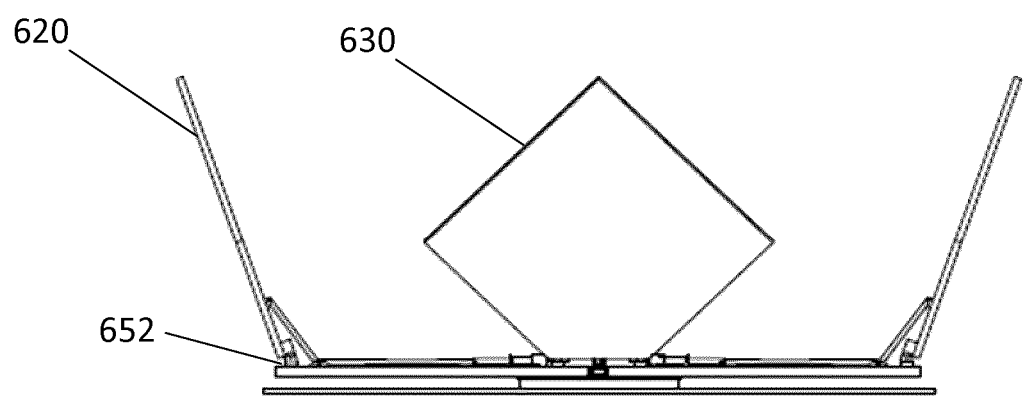
FIG. 27 is a side view of FIG. 25.

FIG. 25 illustrates a top perspective view of the system of FIG. 20 with the four antennas shown in a negative declination position. FIG. 26 and FIG. 27 are top and side views, respectively, of FIG. 25. In the embodiment of FIG. 25, the operating elevation range is adjusted over greater than 90 degrees. Various implementations enable both declination and elevation to allow the RADAR to view above and below the horizontal axis. This adds flexibility to the RADAR platform. In the embodiment shown in FIG. 25, the antenna position controller for each antenna comprises a single actuator 640, and the antenna base connectors 652 comprise a hinge configured to enable both declination and elevation. In the embodiment of FIG. 25, each of antennas 620, 625, 630 and 635 is moveable between a horizontal upward facing operating position (90 degrees relative the vertical axis) and a vertical operating position (0 degrees relative the vertical axis), and also at angles up to and including a horizontal downward facing operating position (−90 degrees relative to the vertical axis). The horizontally upward facing operating position, vertical operating position, and horizontally downward facing operating position, may also be defined respectively at positions of 0 degrees, 90 degrees, and 180 degrees, relative to the horizontal.

Figure 28:
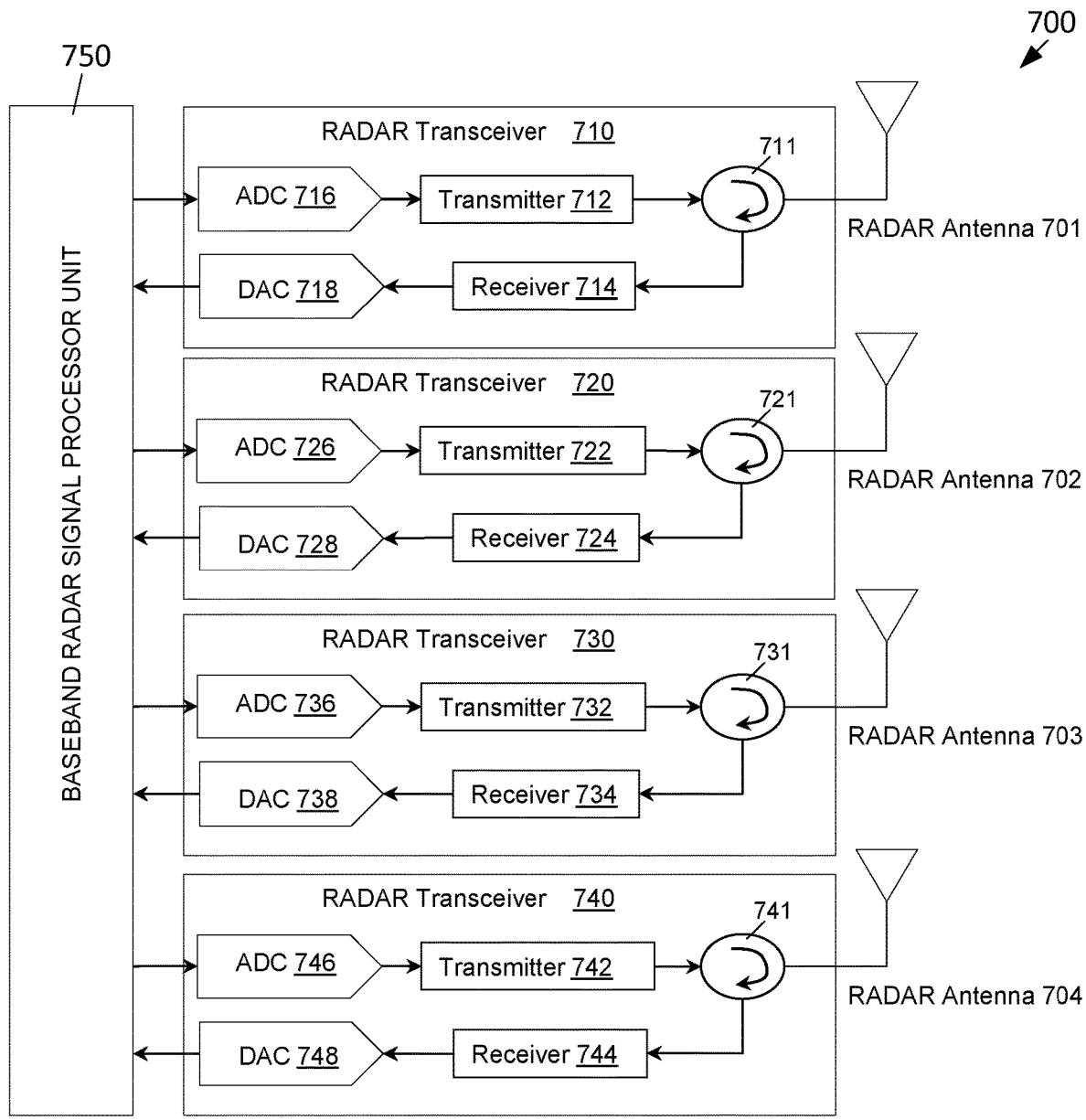
FIG. 28 is a block diagram illustrating a RADAR antenna system according to another embodiment of the present disclosure.

FIG. 28 is a block diagram illustrating a RADAR antenna system 700 according to another embodiment of the present disclosure. In contrast to the embodiments of FIG. 1 through FIG. 27 which illustrate mechanical elements of the system and their interrelationship, the embodiment of FIG. 28 illustrates electrical elements of the system 700 and their interrelationship. The embodiment of FIG. 28 illustrates a plurality of antennas 701, 702, 703 and 704. While the example embodiment of FIG. 28 illustrates four RADAR antennas, other embodiments include two RADAR antennas, or other numbers of RADAR antennas.

Each RADAR antenna 701, 702, 703, 704 is in communication with a respective RADAR transceiver 710, 720, 730, 740. In an embodiment, the first RADAR transceiver 710 comprises a circulator 711 in communication with both a transmitter 712 and a receiver 714. An analog/digital converter (ADC) 716 is in communication with the transmitter 712, and a digital/analog converter (DAC) 718 is in communication with the receiver 714. Similarly, the second RADAR transceiver 720 comprises: a circulator 721 in communication with both a transmitter 722 and a receiver 724; an ADC 726 in communication with the transmitter 722; and a DAC 728 in communication with the receiver 724. The third RADAR transceiver 730 comprises: a circulator 731 in communication with both a transmitter 732 and a receiver 734; an ADC 736 in communication with the transmitter 732; and a DAC 738 in communication with the receiver 734. The fourth RADAR transceiver 740 comprises: a circulator 741 in communication with both a transmitter 742 and a receiver 744; an ADC 746 in communication with the transmitter 742; and a DAC 748 in communication with the receiver 744.

The system further comprises a processor unit 750, such as a baseband RADAR signal processor unit, in communication with each of the ADCs 716, 726, 736 and 746 and with each of the DACs 718, 728, 738 and 748. In an example implementation, the processor unit 750 is configured to perform post-processing for the plurality of antennas 701, 702, 703 and 704 to align the post-processing results from the plurality of antennas.

Antennas in a RADAR system according to an embodiment of the present disclosure, such as the system 700 shown in FIG. 28, may comprise antennas which transmit antenna beams comprising a pulse train or series of repeated signal pulses. A signal pulse from a solid state RADAR system may achieve comparable transmitted energy as, for example, a travelling wave tube transmitter. The transmitted energy of a signal pulse equals the pulse duration (or transmit period) multiplied by the transmitted power.

Figure 29:
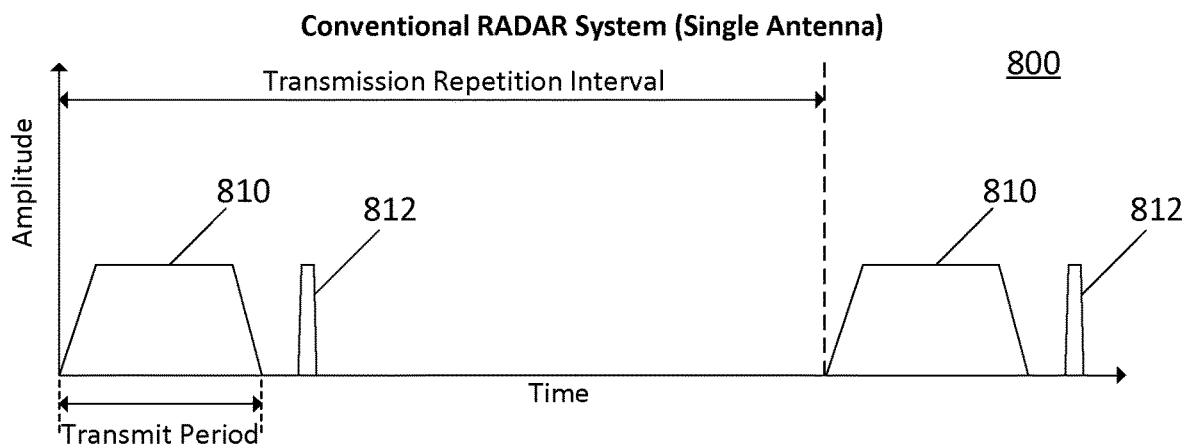
FIG. 29 illustrates a timing diagram for pulses sent by a conventional RADAR.

FIG. 29 illustrates a timing diagram 800 for pulses sent by a conventional RADAR. FIG. 29 represents a conventional approach to resolving targets positioned in the blind range of a solid state RADAR antenna system, where the blind range is outside an unambiguous range of distances within which the RADAR can unambiguously resolve a target. This approach appends a second signal pulse or short pulse 812, to the first signal pulse or long pulse 810 where the short pulse 812 has a pulse duration less than the long pulse 810.

Figure 30:
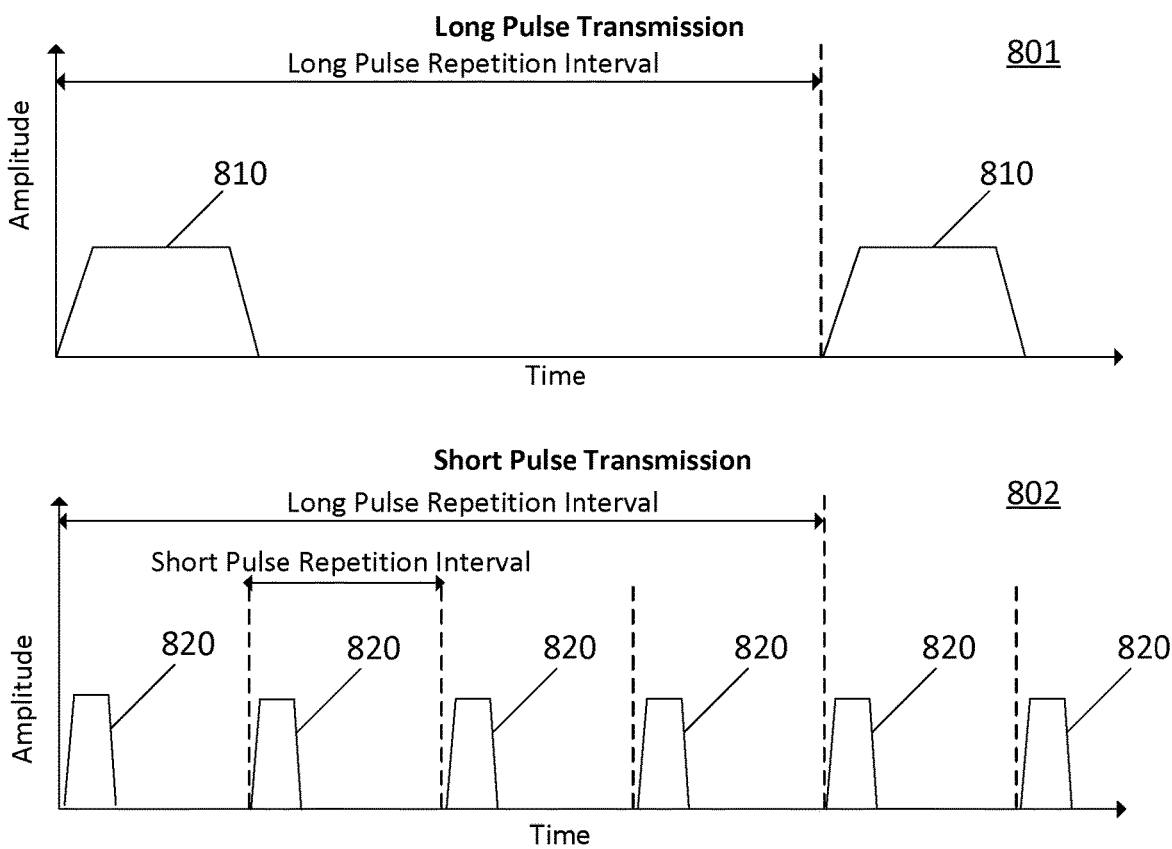
FIG. 30 illustrates a timing diagram for pulses sent by a RADAR antenna system according to an embodiment of the present disclosure.

FIG. 30 illustrates a timing diagram for pulses sent by a RADAR antenna system according to an embodiment of the present disclosure. FIG. 30 illustrates a first pulse diagram 801 and a second pulse diagram 802 associated with pulses transmitted from first and second antennas, respectively. First pulse diagram 801 illustrates a first antenna beam transmitting a first pulse 810 repeating every long pulse repetition interval (or first transmission repetition interval) corresponding to a maximum or desired scan range for a solid state RADAR antenna system. Second pulse diagram 802 illustrates a second antenna beam transmitting a second pulse 820 decoupled from first pulse 810. Decoupling, without limitation, may include separating, isolating, or otherwise lowering cross-contamination between first pulse 810 and second pulse 820. In embodiments described herein, decoupling primarily comprises physical decoupling. In other embodiments, decoupling instead or additionally comprises frequency decoupling and orthogonal polarization.

Figure 31:
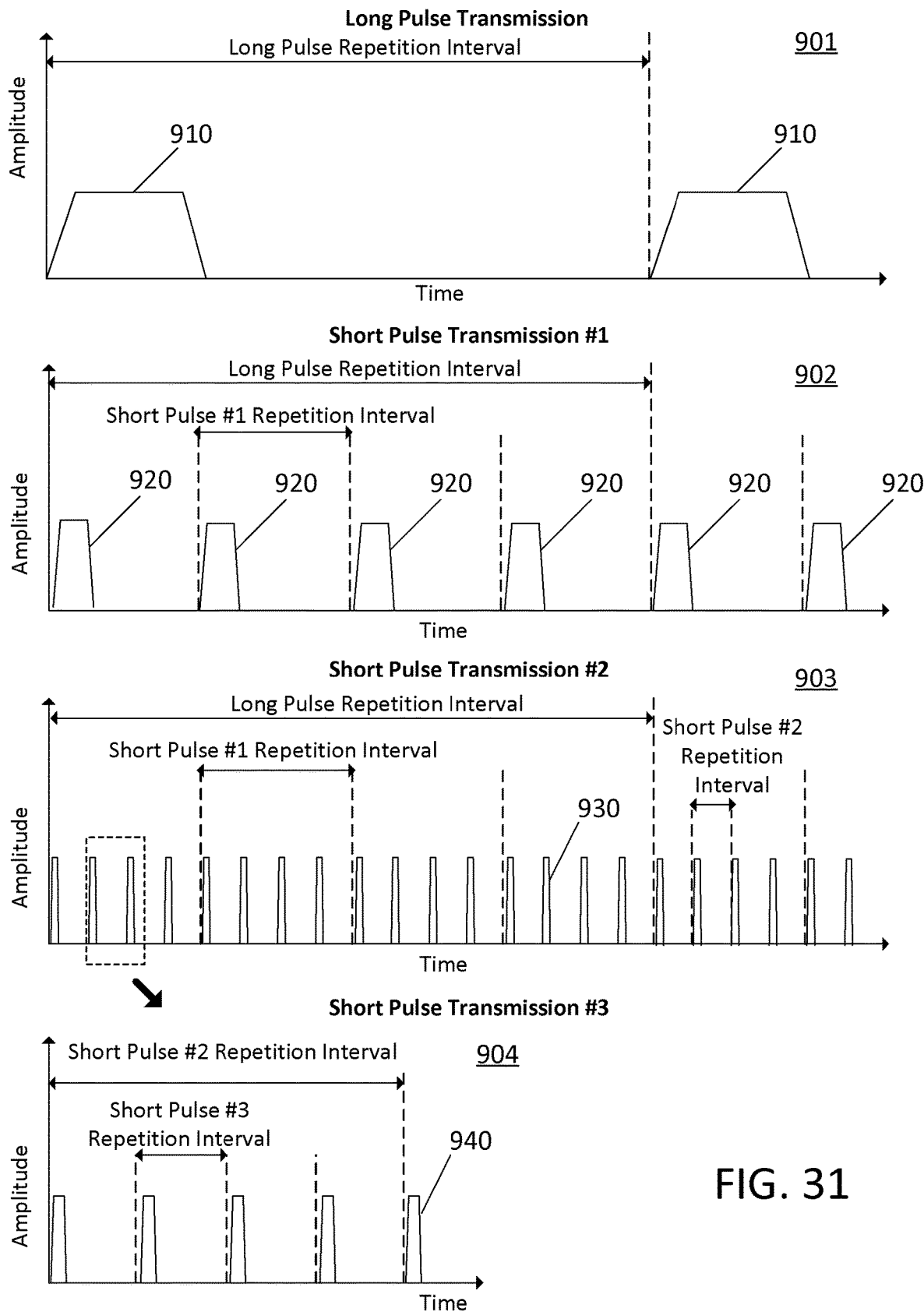
FIG. 31 illustrates a timing diagram for pulses sent by a RADAR antenna system according to another embodiment of the present disclosure.

FIG. 31 illustrates a timing diagram for pulses sent by a RADAR antenna system according to another embodiment of the present disclosure. FIG. 31 illustrates a first pulse diagram 901, second pulse diagram 902, third pulse diagram 903, and fourth pulse diagram 904, corresponding to first, second, third, and fourth antenna beams, respectively, as transmitted from a solid state RADAR antenna system according to an embodiment as disclosed herein. In an example embodiment, the pulse diagrams 901, 902, 903, 904 are associated with pulses transmitted from first, second, third and fourth antennas, respectively. Each antenna beam is decoupled from each other antenna beam by at least one of physical decoupling, frequency decoupling, and orthogonal polarization. In an embodiment, each antenna beam corresponds to a separate antenna, thus each of first pulse 110, second pulse 120, third pulse 130, and fourth pulse 140 is physically decoupled from all pulses. However, other embodiments may implement one or more systems for decoupling. In another embodiment, first pulse 110 and second pulse 120 may transmit from a first antenna which implements frequency decoupling or orthogonal polarization to decouple first pulse 110 from second pulse 120. A second antenna transmitting third pulse 130 and fourth pulse 140 may also implement frequency decoupling or orthogonal polarization to decouple third pulse 130 from fourth pulse 140, the first and second antennas physically decoupled such that the eradiated power from either antenna does no impinge on the other antenna during transmission.

Additional implementation details regarding the pulse diagrams and antenna beam transmissions illustrated in FIG. 29 through FIG. 31 are found in co-pending patent application having the same inventors as the present application and entitled "SYSTEM AND METHOD FOR IMPROVED RADAR SENSITIVITY" filed of even date herewith, which is incorporated herein by reference.

Embodiments of the present disclosure address the problems of scanning speed and blind range in the RADAR system through implementation of two or more antenna plates which achieve two independent antenna beams. Independent control of the antenna plate elevation enables two beams at different heights which in turn allows the same volume space to be scanned in half the time as compared with a single flat plate. In an example embodiment, a slotted array antenna is used, which enables the size of the resultant antenna system to be minimized in contrast with reflect array type antenna systems which require a boom arm to support the radiating elements.

Embodiments of the present disclosure can be scaled to 4 or more antennae. In the case of 4 antennae, four beams of the same or different frequencies can be implemented. In the case of identical beam frequencies the scan rate will increase four fold over that achievable with a single beam. It is also an advantage of embodiments of the disclosure that the four fold scan rate is achieved without an increase in the rotational rate of the antenna. This has advantage in terms of rotator reliability as a system can be operated at a one quarter the speed of a single beam system. In addition, the rotational rate of the antenna can introduce ground clutter at frequencies associated with the rotational rate of the antenna.

In an implementation, each antenna is optimized and operated at a different frequency. For example, the system can operate as a true dual band RADAR operating at C-band and X-band. Such a system would enable improved long range weather sensitivity at C-band whilst achieving high resolution short range sensitivity at X-band.

In the case of four antennae system four different frequencies could be operated concurrently.

If a four antenna plate configuration is used the close-in sensitivity of the RADAR can be further improved through provision of four different optimal pulse durations for achieving a required sensitivity within each blind range.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A RADAR antenna system comprising:
 a base;
 first and second antennas configured to transmit independent first and second antenna beams, respectively, the first and second antennas each being coupled to the base so as to provide a common rotational axis for the first and second antennas; and
 an antenna position controller configured to independently control first and second transmission positions associated with the first and second antennas, respectively,
 the antenna position controller and the first and second antennas cooperating to transmit the first and second antenna beams in different directions such that the first antenna beam is decoupled from the second antenna beam.

2. The system of claim 1 wherein the antenna position controller and the first and second antennas cooperate to transmit the first and second antenna beams in different hemispherical directions.

3. The system of claim 1 wherein the antenna position controller is configured to independently control first and second elevations associated with the first and second antennas, respectively, to transmit the first and second antenna beams at different heights.

4. The system of claim 1 wherein the antenna position controller comprises:
 a first actuator configured to move the first antenna in elevation; and
 a second actuator configured to move the second antenna in elevation.

5. The system of claim 1 further comprising:
 a first antenna base connector configured to couple the first antenna to the base; and
 a second antenna base connector configured to couple the second antenna to the base.

6. The system of claim 1 wherein the first and second antennas operate at different first and second antenna beam frequencies to provide a dual band RADAR.

7. The system of claim 1 further comprising an enclosure coupled to the base, the first and second antennas being coupled to the enclosure so as to provide indirect coupling of the first and second antennas to the base.

8. The system of claim 7 wherein the enclosure is shaped and profiled substantially similar to the first and second antennas, the enclosure being configured to reduce radiative coupling between the first antenna and the second antenna.

9. The system of claim 7 wherein the enclosure houses an azimuth rotator operating at a rotation rate, and wherein the system operates at a scan rate SR2 that is higher than the rotation rate RR.

10. The system of claim 1 wherein each of the first and second antennas is moveable between a plurality of operational positions.

11. The system of claim 1 wherein each of the first and second antennas comprises a slotted array antenna.

12. The system of claim 1 wherein the first antenna is configured to provide a communications function and the second antenna is configured to provide a tracking function.

13. The system of claim 1 wherein the base comprises an azimuth rotator operating at a rotation rate, and wherein the system operates at a scan rate SR2 that is higher than the rotation rate RR.

14. The system of claim 1 wherein the RADAR antenna system comprises a solid state RADAR antenna system, and wherein the first antenna is configured to produce long pulses and the second antenna is configured to produce short pulses.

15. The system of claim 1 further comprising a processor configured to perform post-processing for the first and second antennas to align the post-processing results from the first and second antennas.

16. A RADAR antenna system comprising:
 a base;
 a plurality of antennas configured to transmit at least two independent antenna beams, the plurality of antennas each being coupled to the base so as to provide a common rotational axis; and
 an antenna position controller configured to independently control a transmission position associated with each of the plurality of antennas,
 the antenna position controller and the plurality of antennas cooperating to transmit the at least two independent antenna beams in different directions such that the at least two independent antenna beams are decoupled from one another.

17. The system of claim 16 wherein:
 the plurality of antennas are configured to produce an independent antenna beam for each of the plurality of antennas.

18. The system of claim 17 wherein the antenna position controller and the plurality of antennas cooperate to transmit the plurality of independent antenna beams such that each antenna beam is decoupled from each of the other antenna beams in the plurality of antenna beams.

19. The system of claim 17 further comprising:
 a plurality of RADAR transceivers equal in number to the plurality of antennas, each of the plurality of RADAR transceivers being uniquely associated with one of the plurality of transceivers; and
 a RADAR signal processor configured to perform post-processing for the plurality of antennas to align the post-processing results from the associated RADAR transceivers.

20. The system of claim 16 wherein the antenna position controller and the plurality of antennas cooperating to transmit the at least two independent antenna beams in different hemispherical directions.

21. The system of claim 1 wherein the first and second antennas and cooperate to transmit the first and second antenna beams in opposite directions.

22. The system of claim 16 wherein the plurality of antennas cooperate to transmit the at least two independent antenna beams in opposite directions.

* * * * *